United States Patent [19]
Yamamoto et al.

[11] Patent Number: 5,408,968
[45] Date of Patent: Apr. 25, 1995

[54] ENGINE AND METHOD FOR DESIGNING SAME

[75] Inventors: Hiroyuki Yamamoto; Shigeo Horita; Hiroyasu Uchida, all of Hiroshima, Japan

[73] Assignee: Mazda Motor Corporation, Japan

[21] Appl. No.: 151,987

[22] Filed: Nov. 15, 1993

Related U.S. Application Data

[62] Division of Ser. No. 674,262, Mar. 25, 1991, Pat. No. 5,261,367.

[30] Foreign Application Priority Data

| Mar. 30, 1990 | [JP] | Japan | 2-86691 |
| Mar. 30, 1990 | [JP] | Japan | 2-86692 |
| Mar. 30, 1990 | [JP] | Japan | 2-86693 |
| Oct. 16, 1990 | [JP] | Japan | 2-277128 |

[51] Int. Cl.⁶ .............................. F02P 15/02
[52] U.S. Cl. ...................... 123/309; 123/310
[58] Field of Search ............... 123/310, 638, 308, 309

[56] References Cited

U.S. PATENT DOCUMENTS

| 2,481,890 | 9/1949 | Toews | 123/310 |
| 3,935,844 | 2/1976 | Nishimiya et al. | 123/638 |
| 4,823,753 | 4/1989 | Murakami et al. | 123/417 |

*Primary Examiner*—Andrew M. Dolinar
*Attorney, Agent, or Firm*—Fish & Richardson

[57] ABSTRACT

Disclosed is an engine for an automotive vehicle designed such that a mixed gas supplied to the combustion is burned first in the periphery of the combustion chamber and then over the entire length in the peripheral direction of a cylinder, followed by burning the mixed gas in the center of the cylinder. Plural sources of ignition, i.e. ignition gaps of spark plugs, are so disposed at a peripheral end portion of the combustion chambers in spaced relationship with each other in a cylindrically peripheral direction as to allow the flame ignited by each of the spark plugs to coincide or collide with each other in the cylindrically peripheral direction and thereafter in the center of the cylinder. This arrangement can eliminate NOx and HC and perform dilute combustion, thereby improving fuel economy.

14 Claims, 27 Drawing Sheets

ENGINE AND METHOD FOR DESIGNING SAME

This application is a divisional of U.S. application Ser. No. 07/674,262, filed Mar. 25, 1991, now U.S. Pat. No. 5,261,367.

BACKGROUND OF THE INVENTION

1. Field of the Invention

The present invention relates to an engine and a method for designing the engine and, more particularly, to such an engine capable of performing dilute combustion and improving fuel economy, while eliminating hazardous ingredients, particularly HC and NOx, within exhaust gases.

2. Description of Related Art

For engines of a spark ignition type, represented by gasoline engines, it is considered as ideal to position ignition gaps of spark plugs, namely, sources of ignition, in the center of their combustion chamber. In other words, the spark plugs are disposed in the manner as described hereinabove from the point of view that the flame travel distance from each of the spark plugs to a periphery of the combustion chamber is set to be equal to each other in peripheral direction of the cylinder, or in a cylindrically peripheral direction.

However, recently, an improvement of fuel economy or mileage to a great extent has been required. From this viewpoint, it is considered to burn a mixed air having an air-fuel ratio sufficiently leaner than a stoichiometric air-fuel ratio, namely, to perform a so-called dilute combustion. In performing dilute combustion, sparking performance may become poor and a combustion speed may also become slow, thereby making combustion unstable.

From this point of view, as disclosed in Japanese Patent Laid-open (kokai) Publication No. 57-148,021, there is proposed rapid combustion to be performed by disposing a plurality of sources of ignition to one combustion chamber, namely, by performing a so-called multi-point ignition. Of course, from the viewpoint of performing rapid combustion, the plurality of sources of ignition are so arranged as to allow a distance between each of the sources of ignition to become as small as possible and to become uniform, namely, to allow the distance from any position of the combustion to the nearest source of ignition to become as uniform as possible.

It is to be noted, however, that rapid combustion makes a peak value of a heat production rate (a peak value of a calorific value per unit time) so large that NOx is increased rather than the advantage which should originally be achieved which is that the NOx should be reduced by making the air-fuel ratio lean. In order to reduce NOx once increased, the operation should be performed in a leaner air-fuel ratio, thereby presenting another problem that HC is increased to a great extent. Therefore, a load region capable of performing dilute operation is, practically restricted to an extremely narrow range, and this is a great barrier for in practice performing dilute combustion.

SUMMARY OF THE INVENTION

The present invention has been performed with the aforesaid problems taken into consideration and it has the object to provide an engine and a method for designing the engine adapted to reduce both NOx and HC as well as as to perform dilute combustion.

In order to achieve the aforesaid object, the present invention is basically constructed such that the sources of ignition are disposed at a peripheral edge portion of the combustion chamber and a flame for combustion developed from the sources of ignition is so arranged as to coincide with each other at the center of the combustion chamber after it has spread or travelled over the entire length in the peripheral direction of the cylinder, or in a cylindrically peripheral direction.

More specifically, the present invention consists of the engine comprising:

a source of ignition is disposed at a peripheral edge portion of a combustion chamber; and a flame of combustion produced from the source of ignition is so set as to travel over an entire periphery in cylindrically peripheral direction and then to reach a central portion of a cylinder.

An ideal source of ignition for achieving such combustion is a ring-shaped source of ignition extending over the entire length of the cylinder. In this case, an extremely strong energy is required in sparking, so that such spark plugs as have conventionally been employed are employed herein as they are in practical application and a plurality of sources of ignition are disposed in spaced relationship in the peripheral direction of the cylinder on the peripheral edge portion of the combustion chamber. When the plurality of spark plugs are employed in the manner as described hereinabove, they are so disposed in appropriate positions as to cause burning flames developing from each of the sources of ignition to coincide (collide) with each other in the peripheral direction of the cylinder and thereafter they are allowed to coincide with each other in the center of the combustion chamber.

In accordance with the present invention, a period of time required for combustion is considerably slowed, when compared with that for rapid combustion, and the heat production rate becomes substantially uniform during a period of time for combustion. More particularly, the speed of combustion in the initial stage of combustion is faster yet a peak value of the heat production rate is rendered small (heat generated being made uniform during a period of time for combustion). This small peak value of the heat production rate suppresses an increase in NOx. Further, the combustion starts from the peripheral edge portion of the combustion, so that the quantity of an unburnt mixed air that does not involve combustion at a ring crevice portion (a gap between a top portion of the piston and the cylinder) can be reduced, thereby reducing the quantity of HC to a great extent. Of course, the present invention can also improve the sparking performance that is advantageous for multi-point ignition.

As described hereinabove, the present invention enables NOx and HC to be suppressed and a region in which dilute operation can be performed to be extended, thereby contributing to a great extent to an improvement in fuel economy or mileage.

In disposing the plurality of sources of ignition in the peripheral direction of the cylinder, the aforesaid modes of combustion can be performed by setting a distance in the peripheral direction of the cylinder between each of the sources of ignition, the number of sources of ignition, and a length of each of the sources of ignition projecting from a wall surface of the combustion chamber.

Basically, the disposition of the sources of ignition is determined with the speed at which the flames travel taken into consideration. The aforesaid distance between each of the sources of ignition, number of sources of ignition and length of each of the sources of ignition projecting from the wall surface of the combustion chamber are determined with various factors affecting upon the speed of spreading or travelling the flames, taken into consideration. These include for example, uneven existence of a mixed air within the combustion chamber, the magnitude of a swirl of intake air, a shape of the combustion chamber, a temperature on the wall surface of the combustion chamber, uneven of residual burned gases, etc. This can be applied when a certain engine is taken as an example as well as when the spark plugs are to be disposed for a different engine. Of course, this disposition is desired from the point of view that the number of sources of ignition is reduced as small as possible.

Specifically, the distance between the sources of ignition in the peripheral direction of the cylinder is longer in a region (engine) wherein the speed of traveling or spreading flames is faster, compared with a region (engine) wherein it is slower. The number of sources of spark plugs is likewise set to be smaller and the length of each of the spark plugs projecting from the wall surface of the combustion chamber. It is noted, however, that, although the speed of spreading the flames usually becomes faster as the swirl of intake air gets stronger, a too strong swirl may cause the flame to blow out, so that the length of each of the spark plugs projecting from the wall surface of the combustion chamber should be determined with this point taken into account. On the contrary, a swirl which is too weak causes problems in that sparking performance is impaired or the flame dies out due to the cooling action from the wall surface of the combustion chamber, so that the length of the spark plug projecting therefrom is also determined with this point taken into account. It is noted from the viewpoint of providing good combustion that the source of ignition is disposed at least at a portion where the air-fuel ratio becomes richest in the peripheral direction of the cylinder or in a cylindrically peripheral direction.

It is preferred that the distance between the sources of ignition in the peripheral direction of the cylinder, the number of sources of ignition, and the length of each of the sources of ignition projecting from the wall surface of the combustion chamber are to be determined with the sparking performance taken into account, as well as with the speed of spreading the flame taken into account. In particular, it is preferred to take a temperature on the wall surface of the combustion, a shape of the combustion chamber affecting greatly upon the wall surface temperature thereof, and an air-fuel ratio of a mixed air (an air-fuel ratio over the entire space within the combustion chamber) into consideration to a sufficient extent, because they have a great impact upon the sparking ability.

More specifically, it is preferred that the distance between the sources of ignition in the peripheral direction of the cylinder be set shorter, the number of sources of ignition be set larger, and the length of each of the sources of ignition projecting from the wall surface of the combustion chamber be set longer when the temperature on the wall surface of the combustion chamber is lower than when it is higher, because of the cooling action from the wall surface of the combustion chamber.

Other preferred modes and advantages of the present invention will become apparent in the course of the description of the examples which follow.

BRIEF DESCRIPTION OF THE DRAWINGS

FIGS. 9 and 10 are directed to another embodiment according to the present invention, in which FIG. 9 is a plan view showing the piston when looked at from its top face side and FIG. 10 is a schematic sectional side view showing the shape of the combustion chamber with the piston of FIG. 9 disposed within it.

FIGS. 15 to 22, inclusive, are views showing the ways of disposing the peripheral spark plugs on the basis of the uneven presence of the mixed air and the residual burned gases within the combustion chamber, the difference of temperatures on the wall of the combustion chamber, the difference in the magnitude of the swirl, and so on.

DETAILED DESCRIPTION OF THE PREFERRED EMBODIMENTS

The present invention will be described more in detail with reference to the accompanying drawings.

Figure 1:
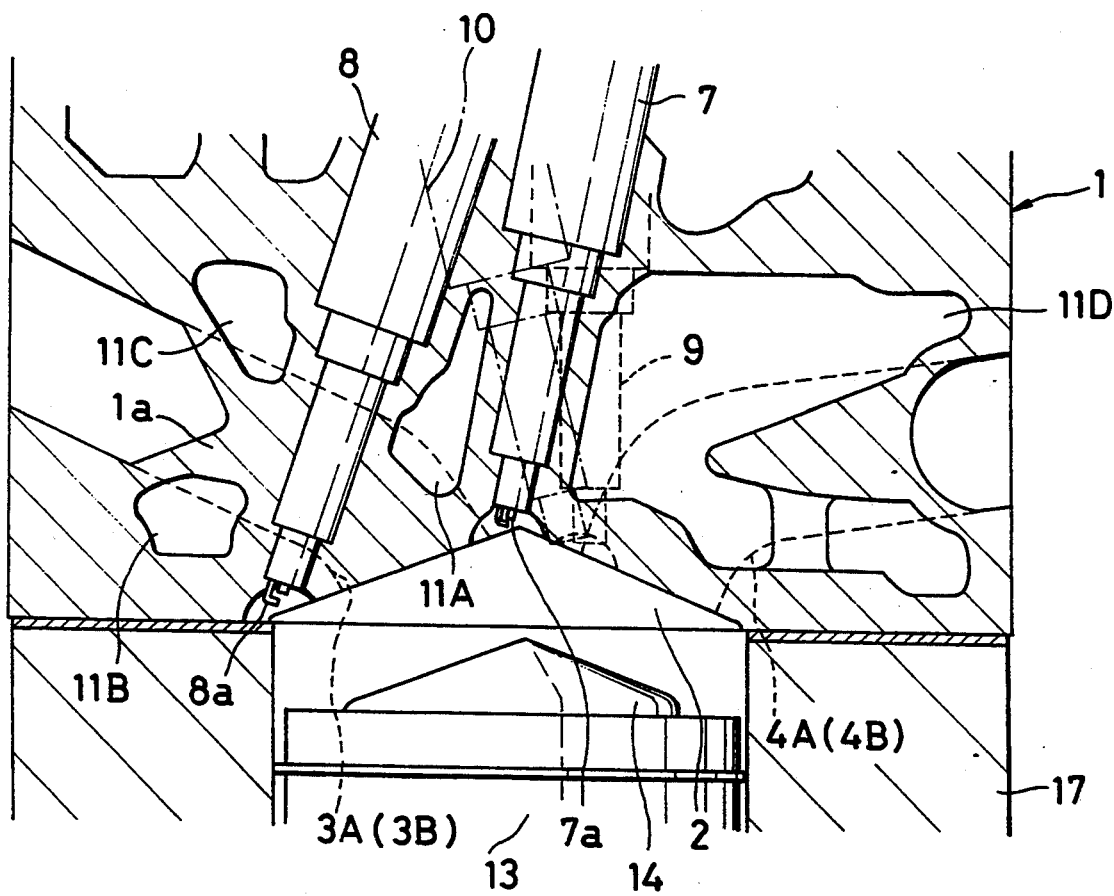
FIG. 1 is a sectional side view showing an embodiment according to the present invention.

FIGS. 1-8:

As shown in FIG. 1, reference numeral 1 denotes a cylinder head and a combustion chamber 2 formed within an inner wall of the cylinder head 1 is of a penthouse-roof type. The cylinder head 1 has a first air intake port 3A and a second air intake port 3B as well as a first exhaust port 4A and a second exhaust port 4B, each communicating with the combustion chamber 2. The first air intake port 3A is constructed to be opened or closed by a first air intake valve 5A at a predetermined timing in synchronization with rotation of a crank shaft not shown in the drawing. Likewise, the second air intake port 3B is opened or closed by a second air intake valve 5B at a predetermined timing in synchronization with rotation of the crank shaft. The first exhaust port 4A is so constructed as to be opened or closed at a predetermined timing by a first exhaust valve 6A in synchronization with the rotation of the crank shaft, while the second exhaust port 4B is likewise opened or closed by a second exhaust valve 6B. Fuel is injected into both of the first air intake port 3A and the second air intake port 3B from a fuel injection valve 16 so as to expand at a predetermined angle.

The cylinder head 1 is provided with a total number of four spark plugs 7, 8, 9 and 10, each of which is detachably mounted to the cylinder head 1 from the respective upward directions. Among the four spark plugs 7, 8, 9 and 10, the spark plug 7 functions as a center plug and a spark gap 7a serving as a spark source is located in the center position of the combustion chamber 2. The center spark plug 7 is so arranged as to be inclined to some extent with respect to the cylinder axis, thereby directing toward the sides of the first exhaust port 3A and the second exhaust port 3B as it is positioned upwards.

The rest of the three spark plugs 8, 9 and 10 function as first, second and third peripheral plugs, respectively. More specifically, the spark plugs 8, 9 and 10 are disposed in substantially equally spaced relationship in the peripheral direction and spark gaps 8a, 9a and 10a as respective spark sources are disposed in the peripheral edge portions of the cylinder. The disposition of the peripheral plugs 8, 9 and 10 and their respective spark gaps 8a, 9a and 10a will be described hereinafter.

The spark gap 8a of the first peripheral spark plug 8 is interposed between the first and second air intake valves 5A and 5B, so that the first peripheral plug 8 is constructed penetrating through a partition wall 1a defining the first and second air intake ports 3A and 3B. The first spark plug 8 is so constructed as to be inclined toward the sides of the first and second exhaust valves 6A and 6B as it is located in upper positions.

The spark gap 9a of the second peripheral spark plug 9 is interposed on the side closer to the first exhaust valve 6A in the peripheral direction of the cylinder (in the clockwise direction in FIG. 2) between the first air intake valve 5A and the first exhaust valve 6A. The second peripheral spark plug 9 is constructed to extend substantially in the direction parallel to the cylinder axis.

The spark gap 10a of the third peripheral spark plug 10 is interposed on the side closer to the second exhaust valve 6B in the peripheral direction of the cylinder (in the counterclockwise direction in FIG. 2) between the second air intake valve 5B and the second air intake valve 5B. The third peripheral spark plug 10 is constructed to extend substantially in the direction toward the sides of the first and second air intake valves 5A and 5B.

It is to be noted as a matter of course that the positions in which the peripheral spark plugs 8, 9 and 10 are so disposed as to cause the burning flame developed from each of the peripheral spark plugs 8, 9 and 10 to converge into a focus at the center of the combustion chamber after the burning flame developing from each of the peripheral spark plugs 8, 9 and 10 has coincided with each other in the peripheral direction of the cylinder, when only the peripheral spark plugs are sparked.

Figure 7:
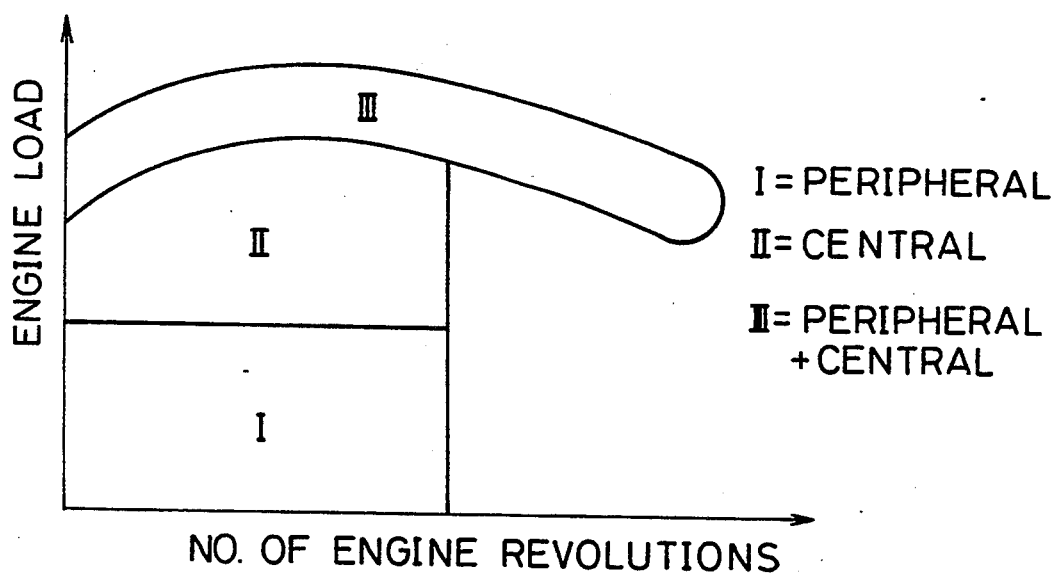
FIGS. 7 and 8 are each a view showing an example of setting an operating range between the central and peripheral spark plugs.
Figure 8:
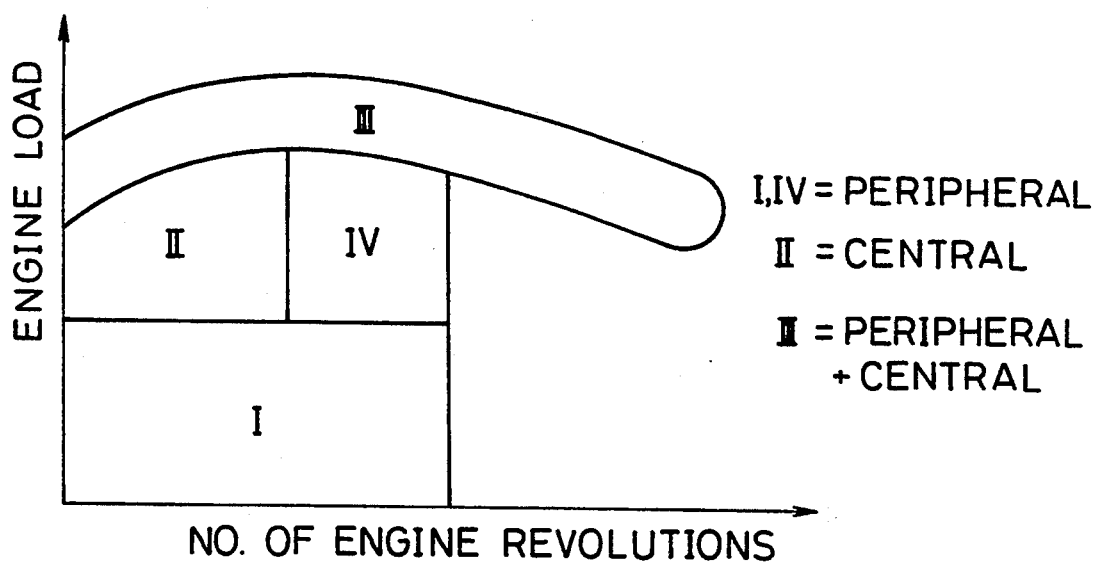

The operation (sparking) of the center spark plug 7 and the peripheral spark plugs 8, 9 and 10 is to be changed over in accordance with the running state of the engine, and FIG. 7 shows an example of setting regions for changeover of sparking. As shown in FIG. 7, reference symbol I denotes a region in which only peripheral sparking is effected by the peripheral spark plugs 8, 9 and 10, reference symbol II denotes a region in which only central sparking is effected by the center spark plug 7, and reference symbol III denotes a region in which both of peripheral sparking and central sparking are effected by all the spark plugs 7, 8, 9 and 10. FIG. 8 shows another example of setting regions for changeover of sparking. As shown in FIG. 8, the region II in FIG. 7 is divided into regions II and IV in which the region II is the same as described hereinabove and the region IV is set as a high-speed cruising region in which only peripheral sparking is effected, while the rest of the regions, i.e. I and III are the same as described hereinabove.

Figure 4:
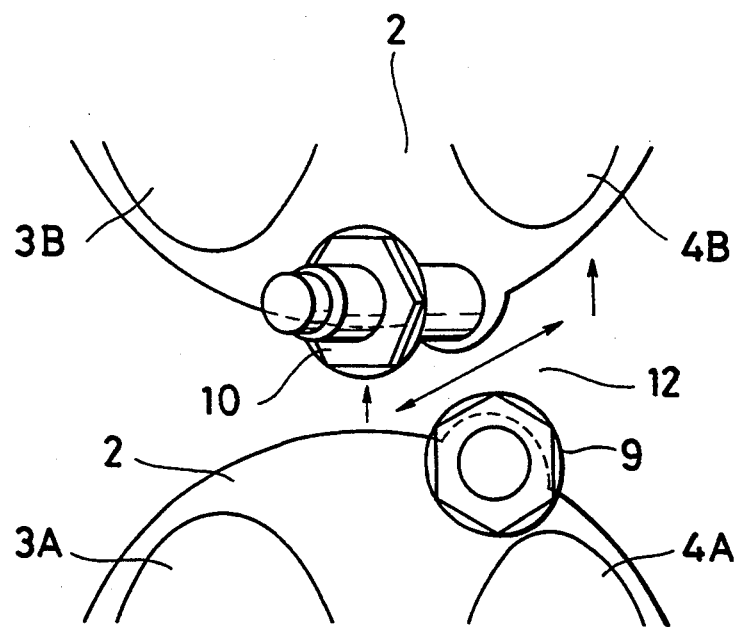
FIG. 4 is a plan view showing the relationship of inclination between the second peripheral spark plug and the third peripheral spark plug with respect to the adjacent cylinders.

Referring further in FIG. 1, reference alphanumerals 11A, 11B 11C and 11D denote cooling water passages. The setting of the center spark plug 7 and the first peripheral spark plug 8 in the inclined directions allow the cooling water passage 11A formed between the spark plugs 7 and 8 to ensure a sufficient passage area. Further, as shown in FIG. 4, a cooling water passage 12 can be formed between the adjacent cylinders so as to have a sufficient opening area by setting the second and third peripheral spark plugs 8 and 9 in the directions in which they are inclined relative to each other. The arrows in FIG. 4 indicate the directions in which cooling water flows.

A ring-shaped projection 14 is formed on a top face of a piston 13 inserted into a cylinder block 17. The upper face of the projection 14 is so formed as to agree with a shape of a penthouse-roof type combustion chamber (a shape of the inner wall of the cylinder head 1). The disposition of the projection 14 can suppress flame sparked by the peripheral spark plugs 8, 9 and 10 from directing toward the center of the combustion chamber 2 (promoting a prevention of expansion of the flame surface in the center direction of the combustion chamber 2). Further, the formation of the projection 14 in a ring-like shape can prevent a majority of a mixed air from being burned in an early stage of combustion because the mixed air can exist in no small quantity in the vicinity of the center of the combustion chamber 2 and a sufficient quantity of the mixed air can be ensured which is to be burned after the peak period for which the flame surface becomes widest (promoting slow combustion).

Figure 5:
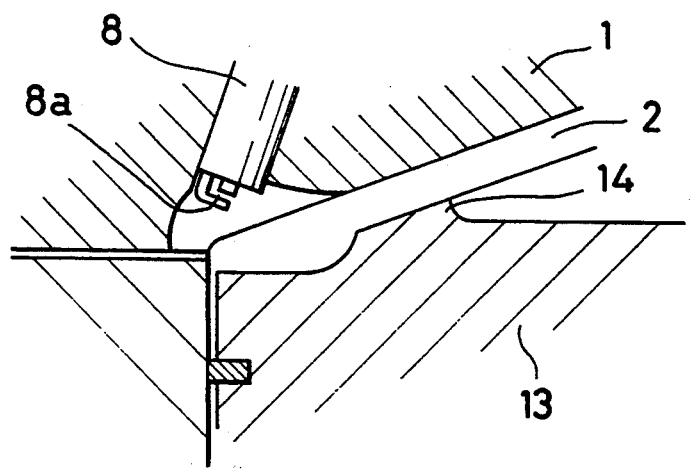
FIG. 5 is a sectional view showing the relationship in position between the first peripheral spark plug and the projection formed on the top face of the piston.
Figure 6:
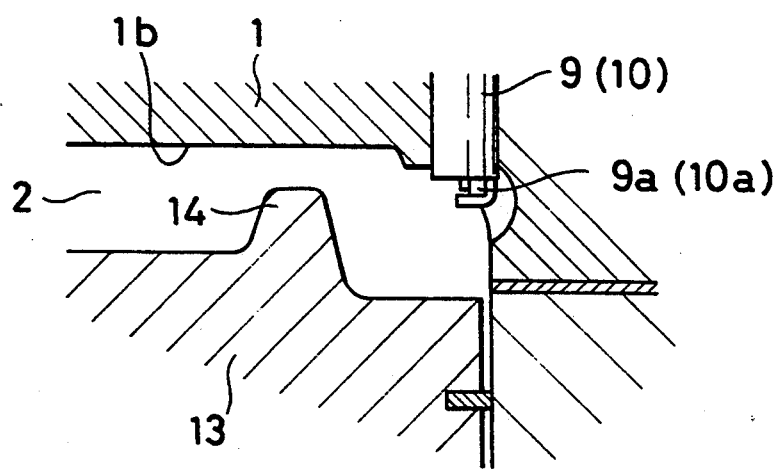
FIG. 6 is a sectional view showing the relationship in position between the second and third peripheral spark plugs and the projection formed on the top face of the piston.

When the projection 14 is so formed as to mate with the combustion chamber 2 of the penthouse-roof type in the manner as described hereinabove, it is preferred to set the vertical positions of the respective spark gaps 8a, 9a and 10a of the first, second and third peripheral plugs 8, 9 and 10 in the manner as will be described hereinafter. More specifically, as shown in FIGS. 5 and 6, it is preferred to mount the spark gap 8a of the first peripheral spark plug 8 so as to be equal in a vertically positional relationship with respect to the spark gaps 9a and 10a of the respectively second and third peripheral spark plugs 9 and 10 (so as to prevent the flame surface 5 from directing to the central side of the combustion chamber 2 to an equal extent). At this end, in this embodiment, with the vertical position for mounting the first peripheral spark plug 8 taken into account, the vertical positions in which the second and third peripheral spark plugs 9 and 10 are mounted are so that the spark gaps 9a and 10a are located in the positions lower than the positions in which the first and second exhaust valves 6A and 6B are seated on the cylinder head 1 (in FIG. 6, reference alphanumeral 1b denoting the vertical position in which the first and second exhaust 6A and 6B are seated).

Referring again to FIG. 2, it is preferred to dispose the peripheral spark plugs 8, 9 and 10 in equally spaced relationship with respect to each other. In this embodiment, however, they are disposed in somewhat differently spaced relationship. More specifically, when the peripheral distance between the first and second peripheral spark plugs 8 and 9 is set to distance (a), the peripheral distance between the second and third peripheral spark plugs 9 and 10 is set to distance (b) and the peripheral distance between the first and third spark plugs 8 and 10 is set to distance (c), these three distances satisfy the following relationship: (a)<(c)<(b). It is to be noted herein that expansion of the flame surface in the peripheral direction is delayed at the portion (b) whose distance is widest. Therefore, the following construction is adopted in this embodiment. First, the second and third spark plugs 9 and 10 (with their respective spark gaps 9a and 10a) are disposed in a concave portion 15 formed in the cylinder head 1 and the distance between the concave portion 15 and the second peripheral spark plug 9 or the third peripheral spark plug 10 is wider in the direction toward the distance b, as shown by symbol X, and narrower in the direction opposite to the distance b, as shown by symbol Y.

The foregoing is description of the basic construction of the present invention, while the following is description of other embodiments according to the present invention and a supplement to the aforesaid description.

Figure 9:
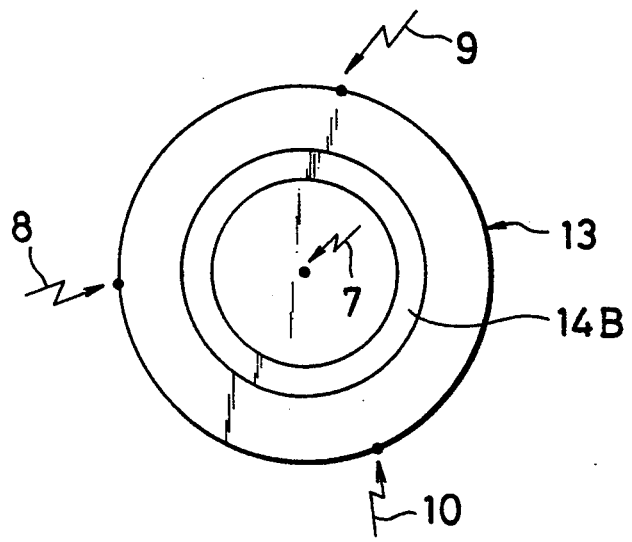
Figure 10:
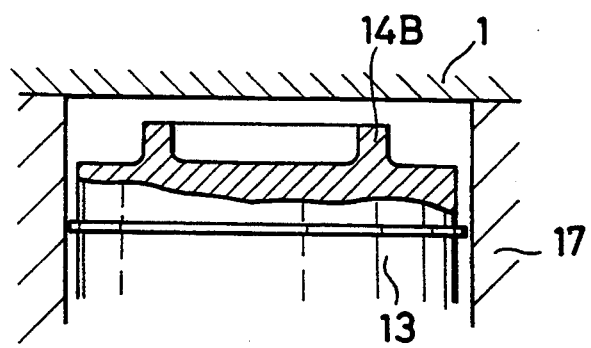

FIGS. 9 and 10:

FIGS. 9 and 10 shows another embodiment according to the present invention. In this embodiment, the inner wall of the cylinder head 1, namely, the upper wall of the combustion chamber 2, is of a flat surface. A ring-shaped projection 14B formed on the top face of the piston 13 is formed in a cylindrical shape coaxially with the cylinder 17.

Figure 11:
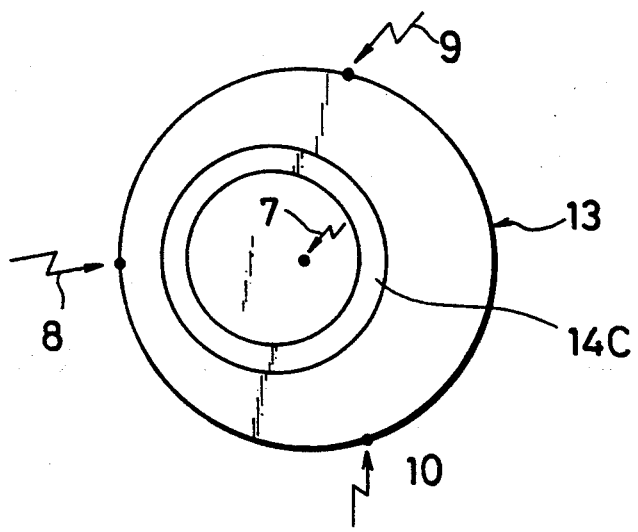
FIG. 11 is a plan view showing a further embodiment according to the present invention, which corresponds to FIG. 9.

FIG. 11:

FIG. 11 shows a further embodiment according to the present invention. In this embodiment, the shape of a ring-shaped projection 14C is identical to the one as shown in FIGS. 9 and 10 and, as a whole, it is offset on the sides of the first and second air intake valves 3A and 3B (on the side of the first peripheral spark plug 8). This is so arranged as for projection 14C to enhance the action of suppressing a flame from traveling or spreading toward the center of the combustion chamber 2 on the air intake valve side relative to the exhaust valve side, by considering the tendency that the concentration of the mixed air on the sides of the air intake valves 3A and 3B becomes denser than that on the sides of the exhaust valves 4A and 4B, namely, by considering the fact that the speed at which the flame travels becomes faster on the air intake valve side than on the exhaust valve side.

Figure 12:
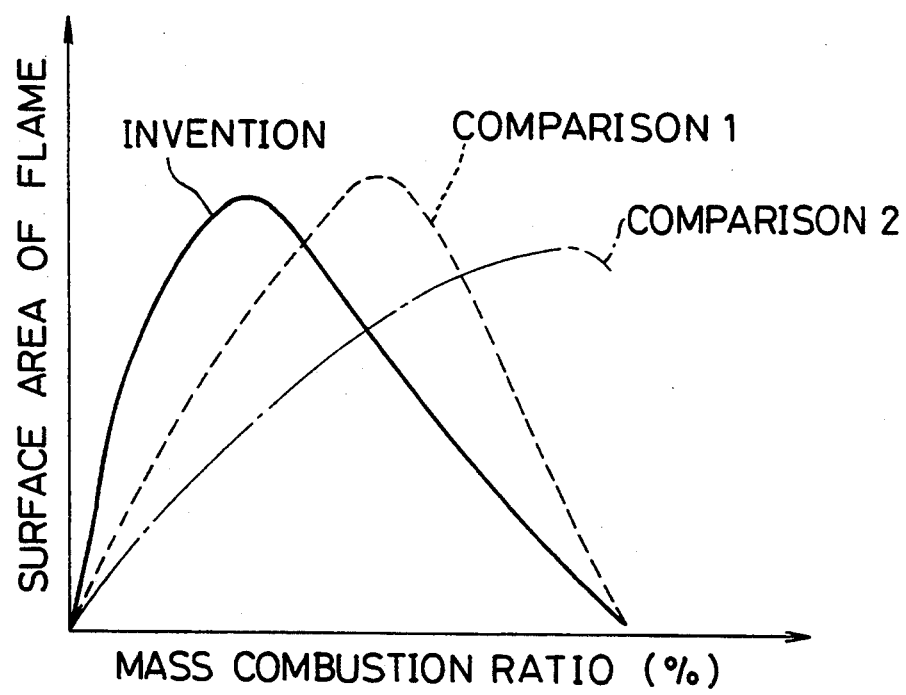
FIG. 12 is a diagrammatic representation of the effect of the ring-shaped projection formed on the top face of the piston.

FIG. 12:

FIG. 12 shows the effect of the present invention in terms of the relationship of the total flame surface area within the combustion chamber 2 with respect to the mass combustion ratio. In FIG. 12, the invention is directed to the construction as shown in FIGS. 9 and 10, in which sparking is effected by the peripheral spark plugs 8, 9 and 10 only. Comparison 1 is directed to an embodiment in which the projection 14B as shown in FIGS. 9 and 10 is formed in a columnar shape (with the solid central portion) and in which sparking is effected by the peripheral spark plugs 8, 9 and 10 only. Comparison 2 is directed to an embodiment in which the construction as shown in FIGS. 9 and 10 is so modified as to miss the projection 14B and sparking is effected by the central plug 7 only. As will be understood from FIG. 12, in the embodiment according to the present invention, the ratio of fuel burned after the peak timing at which the flame surface becomes maximum is increased to an extremely large extent (the ratio of fuel to be burned in an early stage of combustion being smaller).

Figure 13:
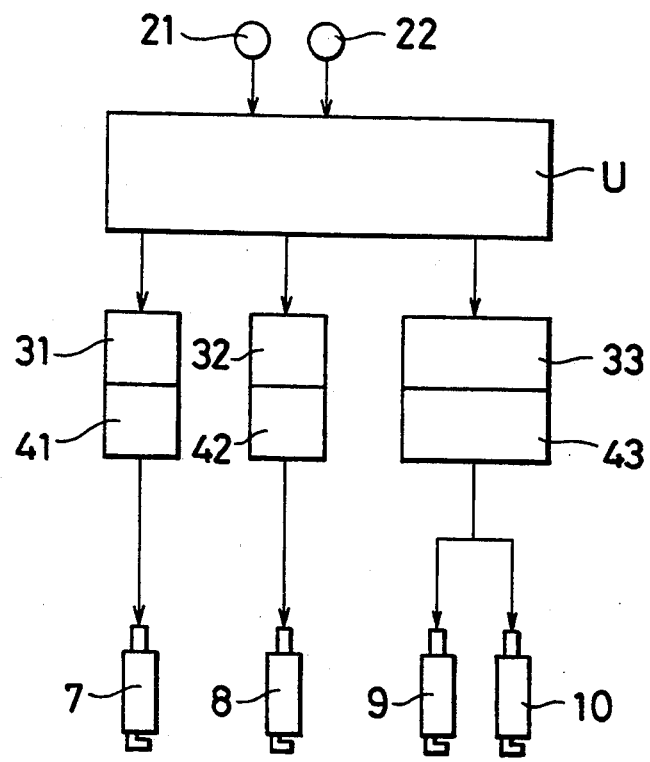
FIGS. 13 and 14 are each a view showing an example in which the spark timing for the peripheral spark plugs is changed.
Figure 14:
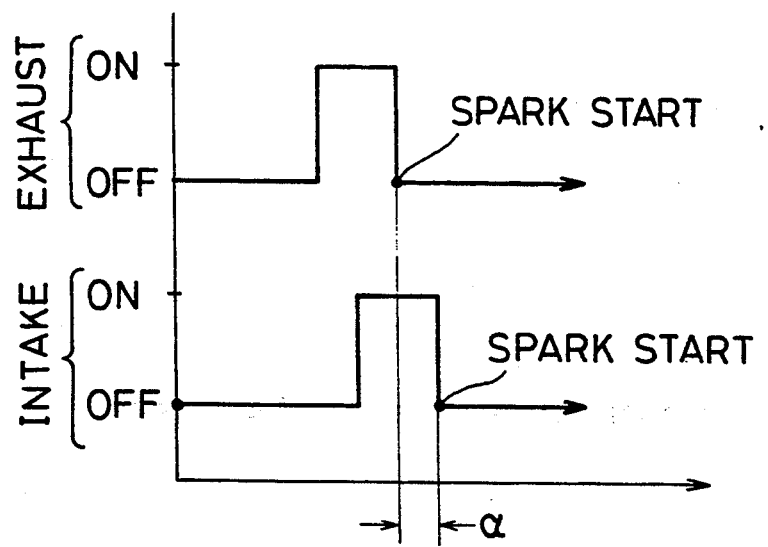

FIGS. 13 and 14:

FIGS. 13 and 14 shows an example in which the peripheral spark plugs 9 and 10 on the exhaust side are sparked at the sparking timing earlier than the peripheral spark plug 8 on the air intake side.

As shown in FIG. 13, reference symbol U denotes a control unit for controlling the sparking timing and for switching the sparking type in accordance with FIG. 7 or FIG. 8. The control unit U is provided with a signal from a sensor 21, indicative of the number of revolutions of the engine, and a signal from a sensor 22, indicative of an engine load (such as a signal indicative of a quantity of intake air). On the other hand, the control unit U generates signals indicative of predetermined sparking timing to igniters 31, 32 and 33. The igniter 31 is to act upon a spark coil 41 for the central spark plug 7, while the igniter 32 is to act upon a spark coil 42 for the first peripheral spark plug on the air intake side as well as the igniter 33 is to act upon a spark coil 43 for both of the second and third peripheral spark plugs 9 and 10 on the exhaust side.

The signal for the spark timing to be generated from the control unit U to the igniter 33 is earlier by a predetermined portion in terms of a crank angle than the signal for the spark timing to be generated to the igniter 32. Specifically, as shown in FIG. 6, the timing at which a primary electric current for the spark coil 43 of the spark plugs on the exhaust side is shut off (the timing at which the sparking is started) is earlier by a crank angle portion α than the timing at which the primary electric current for the spark coil 42 for the spark plug on the air intake side.

Figure 2:
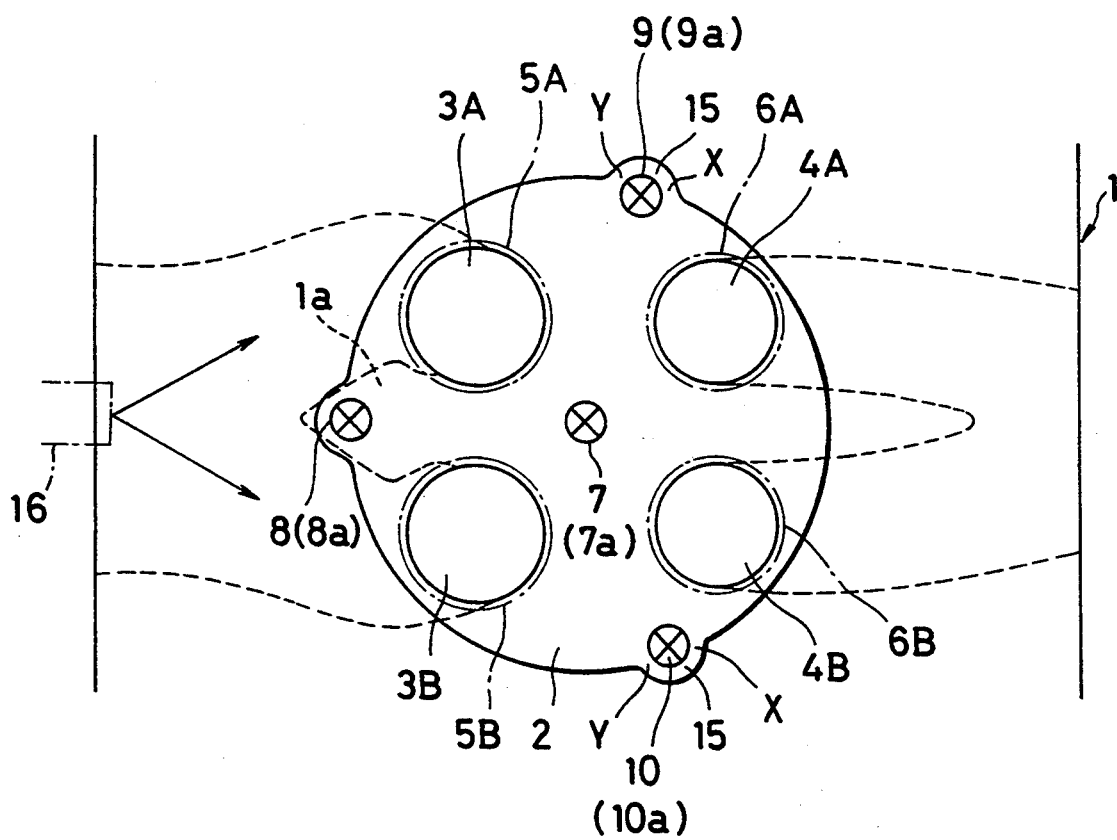
FIG. 2 is a schematic plan view showing the relationship of the positions of the exhaust valves and the spark plugs.

If the number of peripheral spark gaps on the exhaust side is greater than the number of peripheral spark gaps on the air intake side as shown in FIG. 2, the spark timing may be different from the case as shown in FIGS. 13 and 14, although this may likewise be applicable to the case in which the number of peripheral spark gaps on the air intake side is the same as that on the exhaust side.

Figure 15:
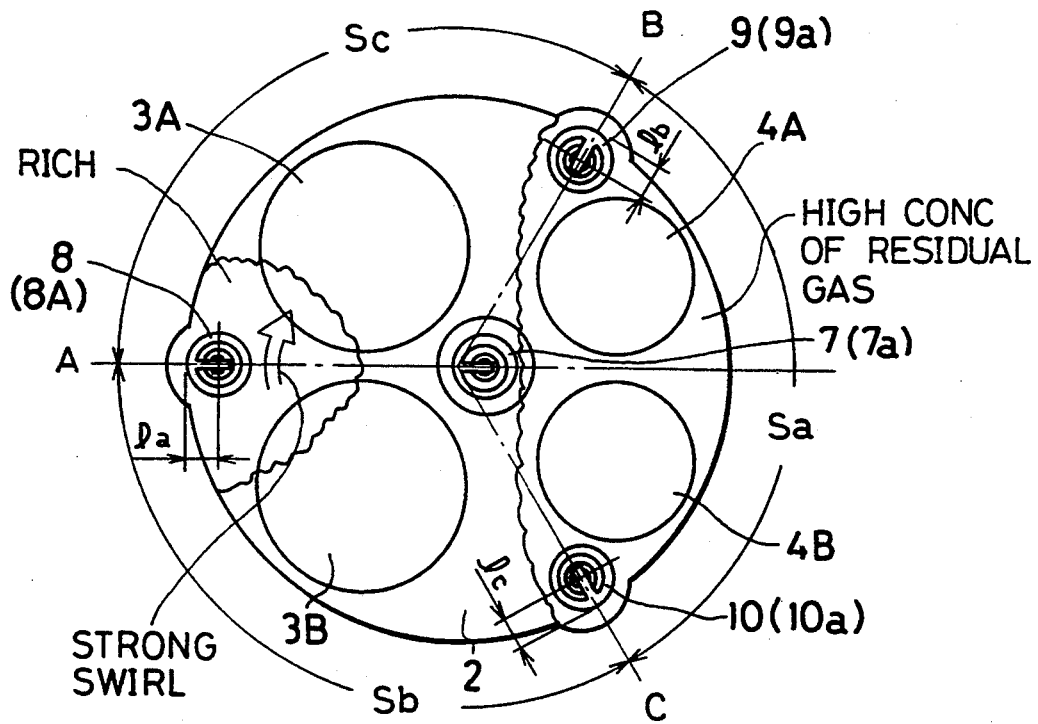

FIGS. 15-22:

FIGS. 15-22 are views showing the way of disposing the peripheral spark plugs, for example, when the mixed air exists unevenly in the combustion chamber 2. FIG. 15 is a view corresponding basically to FIG. 2.

When the mixed air exists substantially uniformly in the peripheral direction of the cylinder or when the concentration of burned residual gases is substantially uniform in the peripheral direction of the cylinder, the distances in the peripheral direction of the cylinder between each of the peripheral spark plugs 8 and 9 (their spark gaps), as represented respectively by reference symbols Sa, Sb and Sc, are set to be substantially equal to each other and the lengths of the respective spark gaps projecting from the wall surface of the combustion chamber, as represented by reference symbols la, lb and lc, are likewise set to be substantially equal to each other.

Figure 20:
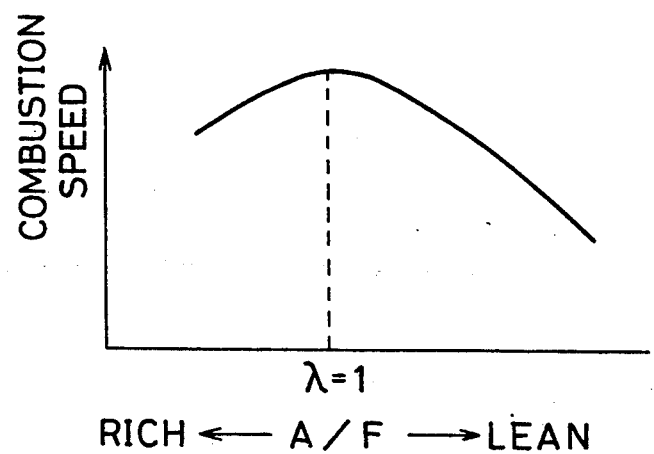

When the air-fuel ratio of the mixed air exists in both a rich state and a lean state in the peripheral direction of the cylinder, there may be the occasion, as shown in FIG. 15, that a region in the vicinity of the first and second air intake ports 3A and 3B is richest and a region in the vicinity of the first and second exhaust ports 4A and 4B is leanest. In this case, at least one of the following relationships is chosen to satisfy, i.e. the distances in the peripheral direction of the cylinder between the peripheral spark plugs 8 and 9 satisfying the relationship: $Sa < Sb, Sc$; the lengths of the spark gaps projecting from the wall surface of the combustion chamber satisfying the relationship: $la < lb, lc$; and making the number of spark plugs in the lean portions B and C more than that in the rich portion A as shown in FIG. 15. As is understood from FIG. 20 showing the relationship of the air-fuel ratio versus the combustion speed, the combustion speed becomes fastest in the vicinity of the stoichiometric air-fuel ratio. If the concentration of burned residual gases varies in the peripheral direction of the cylinder, there may be the occasion, as shown in FIG. 15, that it becomes higher in the vicinity of the first and second exhaust ports 4A and 4B than that in the other portions. In this case, at least one of the following relationships is chosen to satisfy, i.e. the distances in the peripheral direction of the cylinder between the peripheral spark plugs 8 and 9 satisfying the relationship: $Sa < Sb, Sc$; the lengths of the spark gaps projecting from the wall surface of the combustion chamber satisfying the relationship: $la < lb, lc$; and making the number of spark plugs in the higher concentrated portions B and C more than that in the lesser concentrated portion A as shown in FIG. 15.

When the magnitude of a swirl of intake air varies in the peripheral direction of the cylinder, the swirl may become stronger in the vicinity of the air intake ports 3A and 3B than in the vicinity of the exhaust ports 4A and 4B, as shown in FIG. 15. In this case, at least one of the following relationships is chosen to satisfy, i.e. the distances in the peripheral direction of the cylinder between the peripheral spark plugs 8 and 9 satisfying the relationship: $Sa < Sb, Sc$; the lengths of the spark gaps projecting from the wall surface of the combustion chamber satisfying the relationship: $la > lb, lc$; and making the number of spark plugs in the weaker swirling portions B and C more than that in the stronger swirling portion A as shown in FIG. 15.

Figure 21:
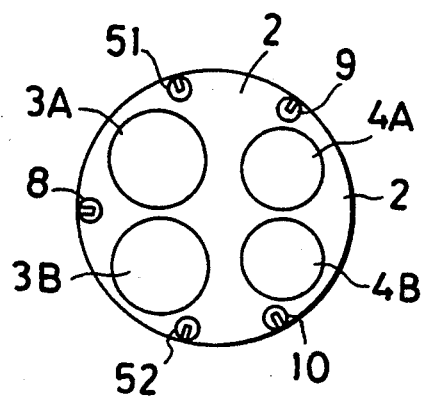

When the temperature on the wall surface of the combustion chamber varies in the peripheral direction of the cylinder, the wall portion A is lower in the wall surface temperature than the wall portions B and C, as shown in FIG. 15. In this case, at least one of the following relationships is chosen to satisfy, i.e. the distances in the peripheral direction of the cylinder between the peripheral spark plugs 8 and 9 satisfying the relationship: $Sa < Sb, Sc$; the lengths of the spark gaps projecting from the wall surface of the combustion chamber satisfying the relationship: $la > lb, lc$; and making the number of spark plugs in the lower portion A more than that in the higher portions B and C as shown in FIG. 15 (adding peripheral spark plugs 51 and 52 as shown in FIG. 21).

Figure 18:
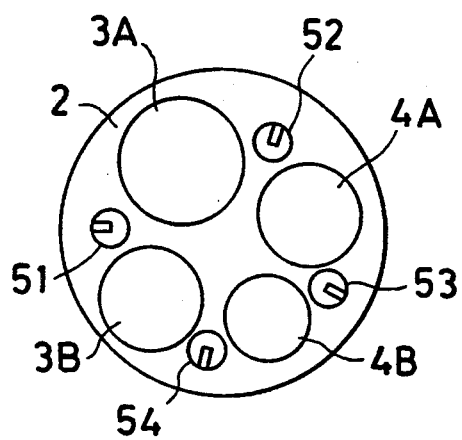

Further, when the mixed air exists unevenly in the radial direction of the cylinder and when the air-fuel ratio in the vicinity of the central portion of the combustion chamber 2 is a substantially stoichiometric air-fuel ratio, —in other words, when the air-fuel ratio in the peripheral portion of the combustion chamber 2 is richer or leaner in the stoichiometric air-fuel ratio—at least one of the following is chosen, i.e. increasing the number of peripheral spark plugs as shown in FIG. 18 (a total number of four peripheral spark plugs 51, 52, 53 and 54 being disposed in FIG. 18), shortening the distances between each of the peripheral spark plugs in the peripheral direction of the cylinder, and increasing the lengths of the spark gaps projecting from the wall surface of the combustion chamber. On the other hand, when the air-fuel ratio is substantially stoichiometric in the peripheral portion of the combustion chamber 2, i.e. when the air-fuel ratio in the vicinity of the central portion of the combustion chamber 2 is richer or leaner than the stoichiometric air-fuel ratio, at least one of the following is chosen to the contrary of the case as shown in FIG. 18, i.e. decreasing the number of peripheral spark plugs as shown in FIG. 19, lengthening the distances between each of the peripheral spark plugs in the peripheral direction of the cylinder, and shortening the lengths of the peripheral spark plugs 8, 9 and 10 projecting from the wall surface of the combustion chamber.

Figure 19:
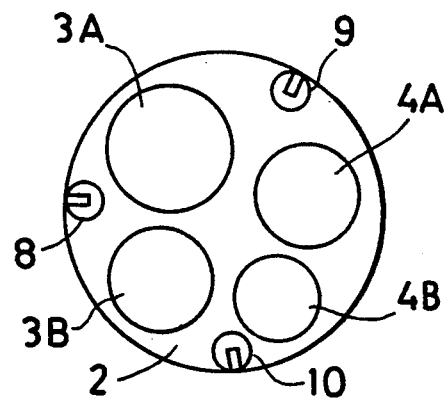

When the concentration of the burned residual gases varies in the radial direction of the cylinder, for example, when the concentration of the burned residual gases is higher in the vicinity of the central portion of the combustion chamber than at the peripheral portion of the combustion chamber, on the one hand, the peripheral spark plugs may be disposed in the manner as shown in FIG. 19. On the contrary, when the concentration of the burned residual gases is higher at the peripheral portion of the combustion chamber than in the vicinity of the central portion of the combustion chamber, the peripheral spark plugs may be disposed in the manner as shown in FIG. 18.

Figure 16:
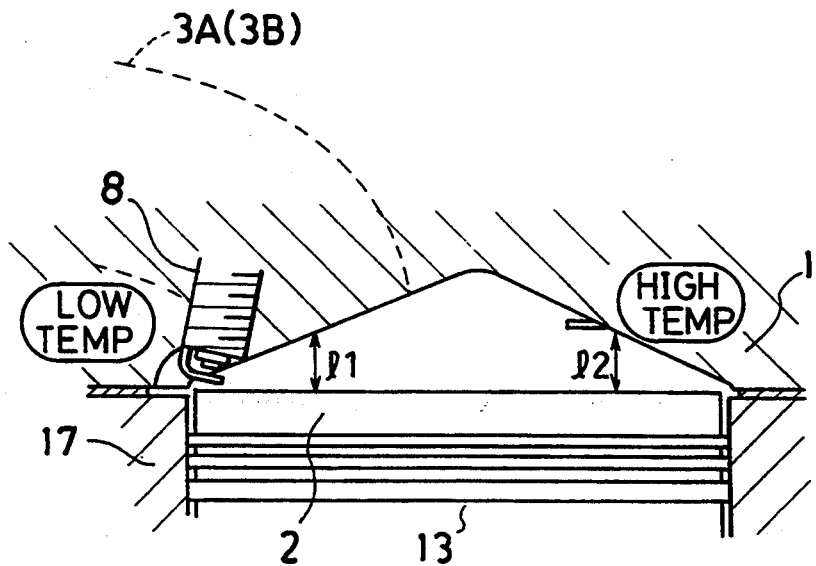
Figure 17:
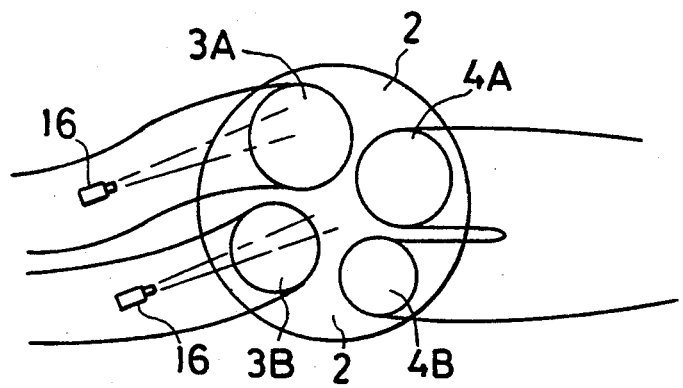

It is to be noted that the uneven presence of the mixed air and the residue of the burned gases as well as the variation in the magnitude of a swirl is likely to occur, for example, when the radii of the first and second air intake ports 3A and 3B are different from each other and further the direction in which they are directed are different from each other, as shown in FIG. 17. In particular, when a space formed between one top face of the piston and the upper wall of the combustion chamber as represented by reference symbol 11 is different from a space formed and defined between the other top face of the piston and the upper wall of the combustion chamber as represented by reference symbol 12, as shown in FIG. 16 ($11 < 12$), the magnitude of the swirl is likely to become stronger at the narrower space portion 11 than at the broader space portion 12. And the wall temperature is likely to become lower at the narrower space portion 11. The smaller the spaces 11 and 12, namely, the smaller a space of a path through which the flame travels or spreads toward the central portion of the combustion chamber from the peripheral portion thereof, the slower the spread of the flame is likely to become due to the cooling action of the wall surface of the combustion chamber. Therefore, when the space portion is smaller, as compared with the broader space portion, at least one of the following is chosen, i.e. making the space between the peripheral spark plugs in the peripheral direction of the cylinder smaller, increasing the number of peripheral spark plugs, and the length of the peripheral plug projecting from the wall surface of the combustion chamber.

Figure 22:
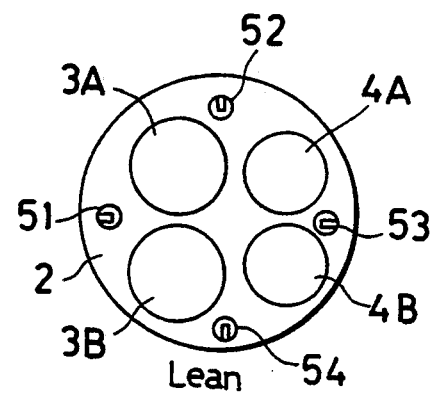

It is to be noted herein that the air-fuel ratio of the mixed air to be fed to the combustion chamber, namely, the air-fuel ratio when the combustion chamber is considered as a whole, has a remarkably great impact particularly upon the sparking ability. In this case, when the air-fuel ratio of the mixed air is rich (particularly a stoichiometric air-fuel ratio), as compared with the lean air-fuel ratio (particularly a dilute air-fuel ratio) at least one of the following is chosen, i.e. decreasing the number of peripheral spark plugs, prolonging the space between the peripheral spark plugs in the peripheral direction of the cylinder, and shortening the length of the peripheral spark plugs projecting from the wall surface of the combustion chamber. For example, FIG. 21 shows the case in which the air-fuel ratio of the mixed air is rich, while FIG. 22 shows the case corresponding to the lean air-fuel ratio of the mixed air (the peripheral spark plugs being represented by reference numerals 51–54, inclusive).

Figure 23:
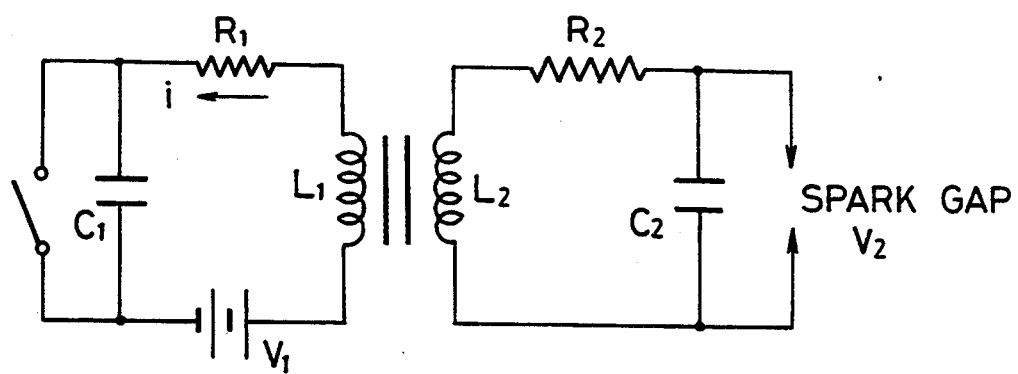
FIG. 23 is a spark circuit diagram for description of the difference in the spark energy.

FIG. 23:

FIG. 23 shows the instance in which the variation between each of the peripheral spark plugs in the speed at which the flame spreads and in the sparking ability is offset by a spark energy and a discharge time period. More specifically, FIG. 2 or FIG. 15 shows the cases in which the peripheral spark plugs 9 and 10 in the vicinity of the exhaust ports 4A and 4B, where the speed of spreading the flame is slower and the sparking ability is poorer, has a higher discharge energy or a longer discharge time period than the peripheral spark plug 8 located at the portion where the speed of spreading the flame is faster and the sparking ability is better. From this reason, the characteristic of a spark circuit 43 for the peripheral spark plugs 9 and 10 and a spark circuit 42 for the peripheral spark plug 8 may be altered, for instance, as shown in FIG. 13. FIG. 23 shows an example of a general construction of each of the spark circuits 41 to 43, inclusive, in which the the primary resistance R1 is altered in a known manner, thereby changing the primary electric current i so as to vary the discharge energy. Further, the discharge period time may be changed by changing the setting of inductances L1 and L2 as well as a mutual inductance M between both of the coils.

FIGS. 24–29:

FIGS. 24 to 29, inclusive, show instances in which a burning flame produced by each of the peripheral spark plugs 8–10, inclusive, can spread uniformly, under conditions that the combustion speed on the side of the first and second air intake ports 3A and 3B is faster than that on the side of the first and second exhaust ports 4A and 4B, for example, as shown in FIG. 2. The uniform spread of the flame is of significance for reducing a peak value (a maximum value) of the heat production ratio, thereby facilitating a reduction in NOx.

Figure 24:
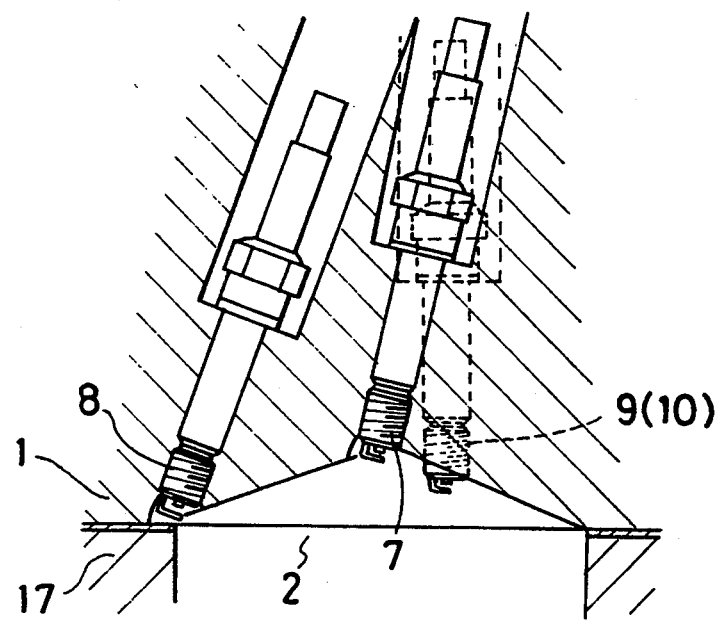
FIGS. 24 to 38, inclusive, are views showing preferred modes according to the present invention.

First, FIG. 24 shows the case in which each of the lengths of the peripheral spark plugs 9 and 10 on the sides of the first and second exhaust ports 4A and 4B is longer than that of the peripheral spark plug 8 (and that of the central spark plug 7).

Figure 25:
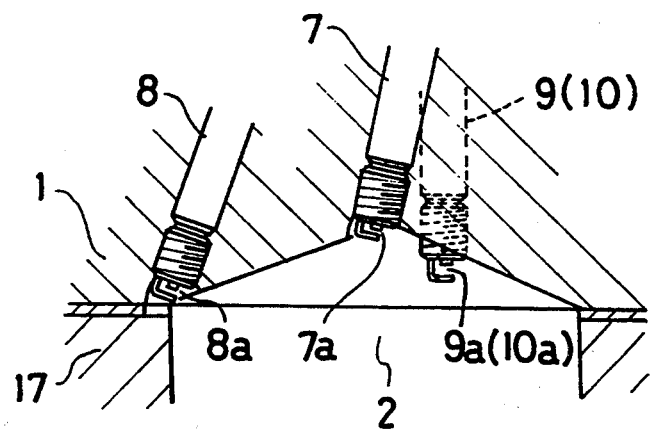

FIG. 25 shows the case in which each of the spark gaps for the peripheral spark plugs 9 and 10 is broader than that for the peripheral spark plug 7 (and that for the central spark plug 7).

Figure 3:
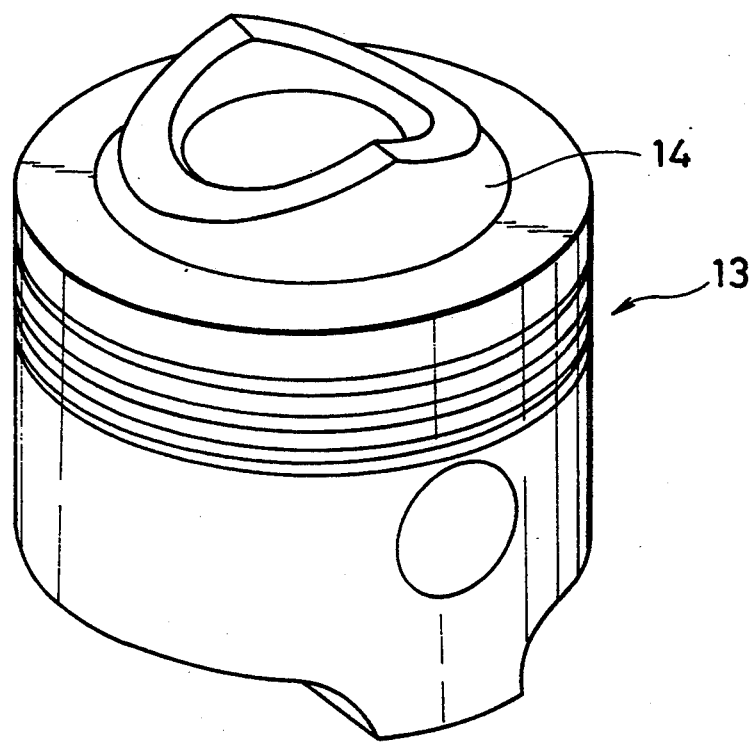
FIG. 3 is a perspective view showing a projection formed on a top face of the piston.
Figure 26:
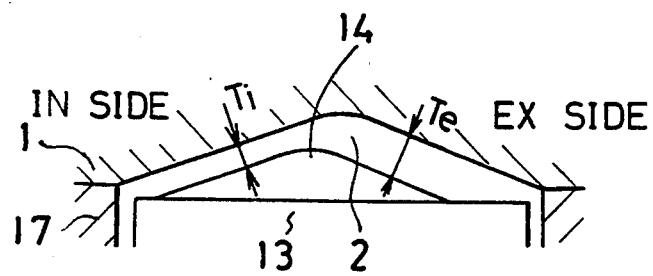

As shown in FIG. 26, this is directed to the case in which a space Te between the ring-shaped projection 14, as shown in FIG. 3, and the upper wall of the combustion chamber on the side of the first and second exhaust ports 4A and 4B (EX side) is greater than a space Ti on the side of the first and second air intake ports 3A and 3B (IN side).

Figure 27:
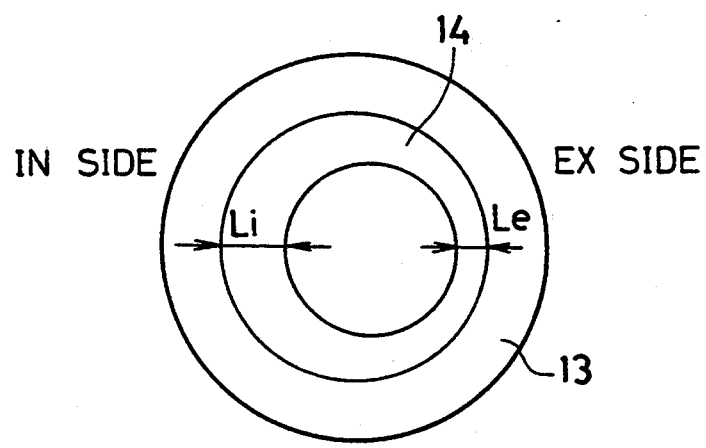

FIG. 27 shows the case in which a width Le of the ring-shaped projection 14, as shown in FIG. 3, on the side of the first and second exhaust ports 4A and 4B (EX side) is less than a width Li on the side of the first and second air intake ports 3A and 3B (IN side).

Figure 28:
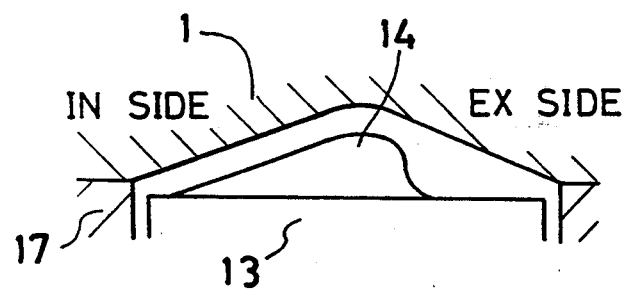

FIG. 28 is directed to the instance in which the ring-shaped projection 14 as shown in FIG. 3 is formed in such a shape that no projection is provided on the side of the first and second exhaust ports 4A and 4B (EX side).

It is also noted that the flame can be spread uniformly by disposing the second and third peripheral spark plugs 9 and 10 on the exhaust ports 4A and 4B on the side closer to the central portion of the combustion chamber than the first peripheral spark plug 8.

Figure 29:
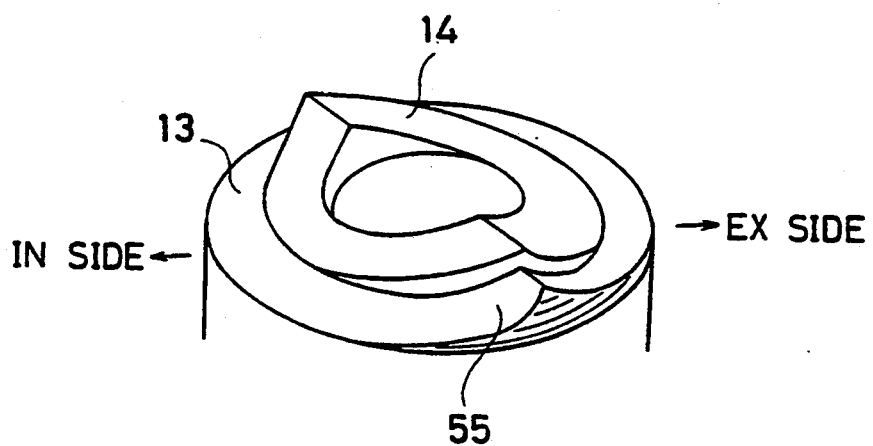

FIG. 29 shows the case in which the peak value of the heat production ratio is reduced by decreasing the quantity of the mixed air to be burned until the burning flame coincides with each other by reducing the exterior volume of the ring-shaped projection 14 due to a formation of a projection 55 on the outer side of the ring-shaped projection 14 formed on the top face of the piston 13 in such a shape parallel to the upper wall surface of the combustion chamber. The instance as shown in FIG. 29 is the same in terms of reducing the peak value of the heat production ratio yet different in terms of spreading the burning flame uniformly.

FIGS. 30–38:

FIGS. 30 to 38, inclusive, show preferred embodiments.

Figure 30:
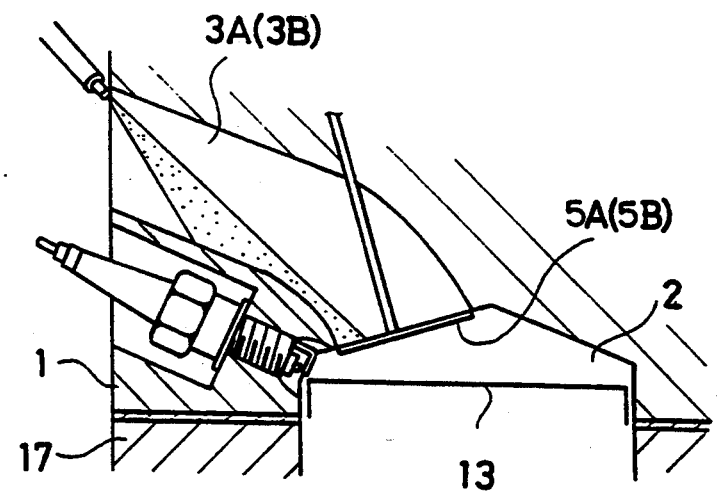

First, FIG. 30 is directed to the case in which the spark gap 8a of the first peripheral spark plug 8 is located immediately underneath the first and second air intake ports 3A and 3B and the fuel to be injected from the fuel injection valve 16 is directed to the bottom surface of the air intake port 3A (3B) disposed just below the first peripheral spark plug 8, thereby promoting gasification or atomization of the fuel.

Figure 31:
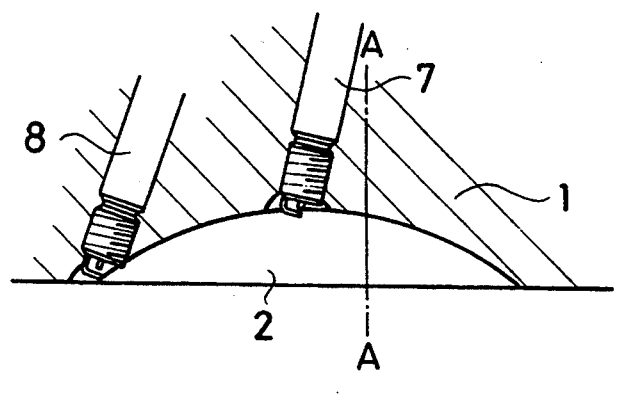
Figure 32:
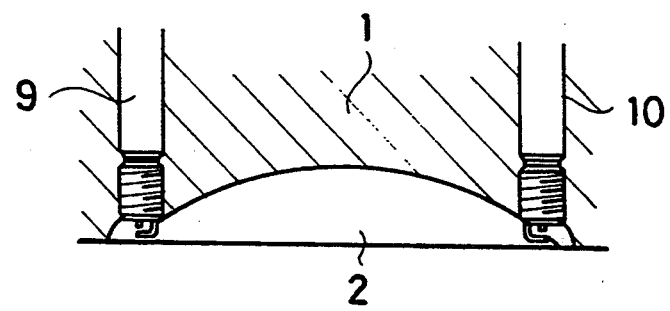

FIGS. 31 and 32 show the case in which the heights of the peripheral spark plugs 8 to 10, inclusive, are set to be identical to each other when the combustion chamber 2 is so constructed as to be in a semi-spherical form.

Figure 33:
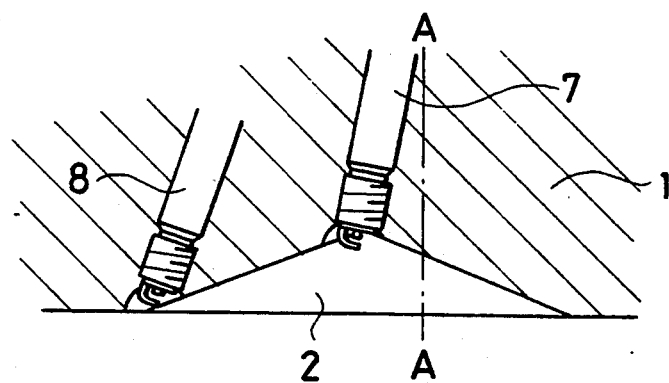
Figure 34:
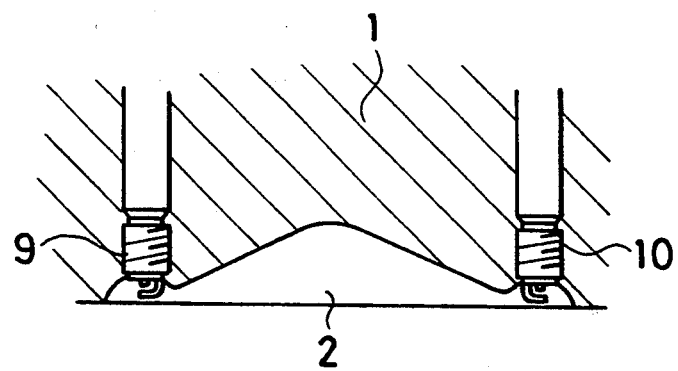

FIGS. 33 and 34 are directed to the instance in which the heights of the peripheral spark plugs 8 to 10, inclusive, are set to be identical to each other when the combustion chamber 2 is so constructed as to be in a conical form.

Figure 35:
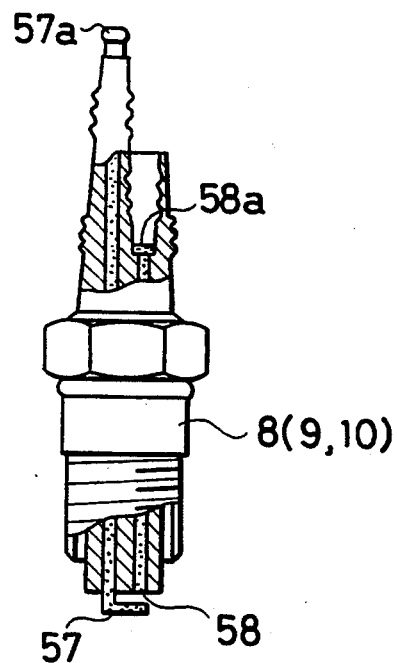

FIG. 35 shows an embodiment of each of the peripheral spark plugs 8 to 10, in which a contact terminal 57a and a contact terminal 58a are so disposed as to be individually and independently connected to an exterior electrode 57 and an interior electrode 58 of each of the peripheral spark plugs 8 to 10, inclusive. The disposition of the contact terminals 57a and 57b enables a connection of the plural peripheral spark plugs 8 to 10 in a series, thereby reducing the number of spark coils.

Figure 36:
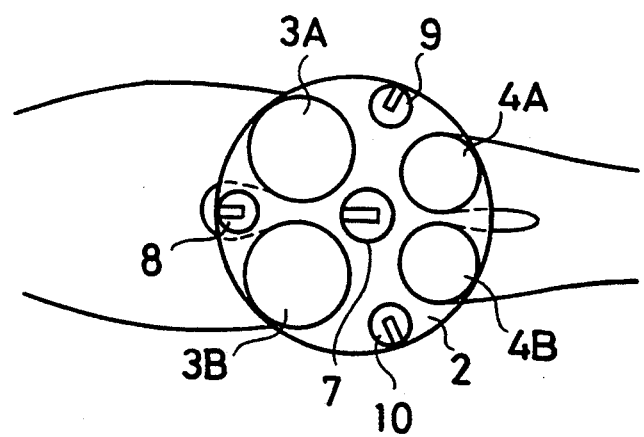

FIG. 36 is directed to the instance in which the size and the heat rating of the central spark plug 7 which is disposed under the thermally severest conditions are set to be greater than those of each of the peripheral spark plugs 8 to 10.

Figure 37:
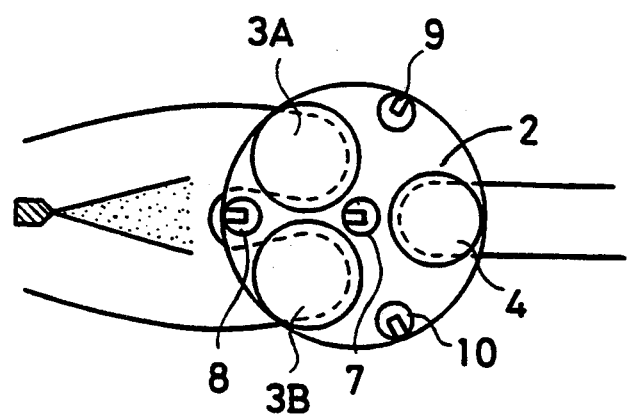

Further, FIG. 37 shows an example of the disposition of the spark plugs relative of a so-called three-valve engine having the two air intake ports 3A and 3B and one exhaust port 4.

Figure 38:
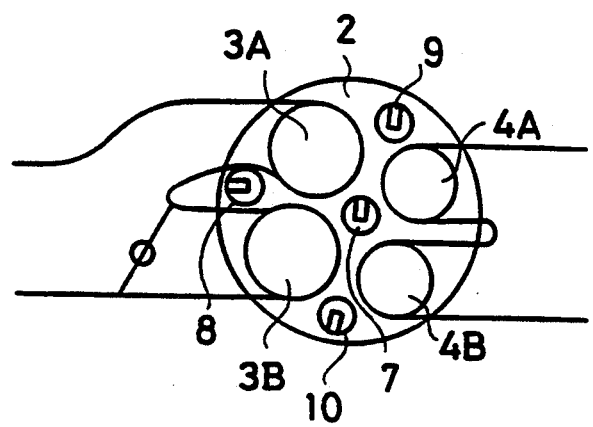

FIG. 38 is directed to an example of the disposition of the peripheral spark plugs 8 to 10, in which the two air intake ports 4A and 4B are offset more than the instance shown in FIG. 2 so as to dispose the peripheral spark plugs 8 to 10 in more optimum positions.

FIGS. 39-58:

FIGS. 39 to 58, inclusive, are directed to examples in which the spread of the flame is so devised as to become uniform, for example, by providing the spark timing of the peripheral spark plugs with a phase difference and in which the spark control is performed during the transfer from the lean state of the air-fuel ratio to the rich state thereof (the stoichiometric air-fuel ratio), which occurs when the engine is transferred to a high load state from low load state.

Figure 39:
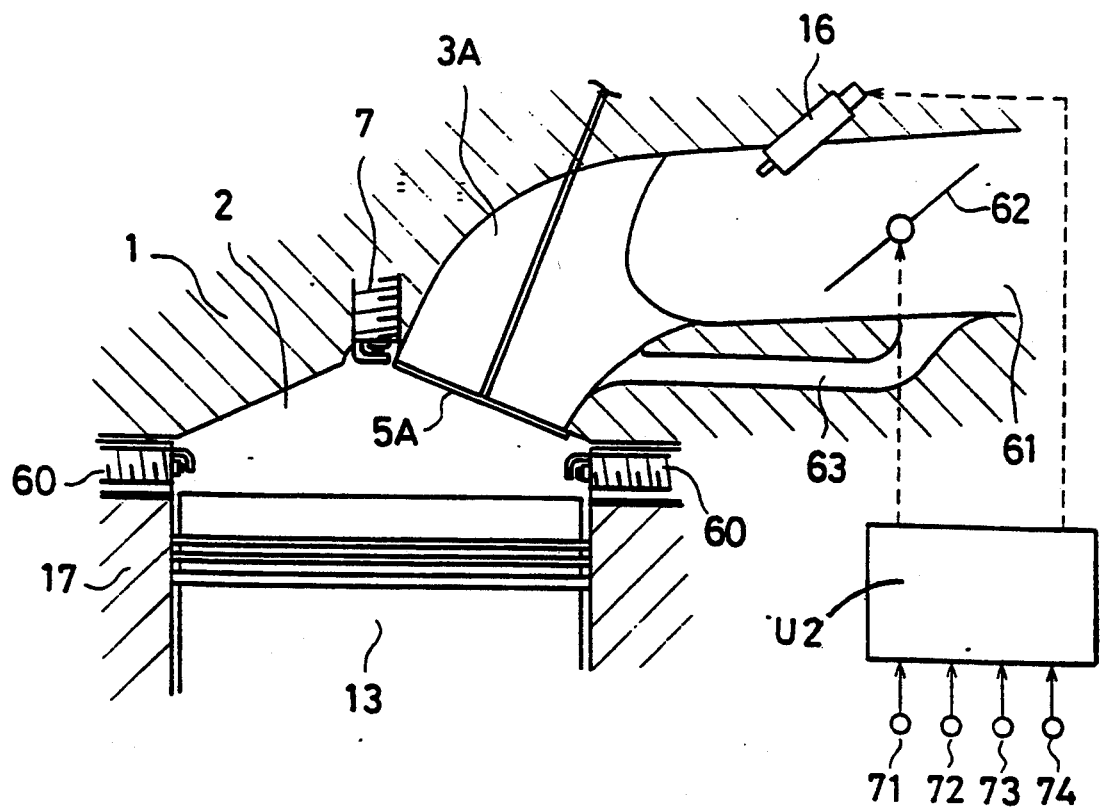
FIGS. 39 to 54, inclusive, are views for description of the phase difference between the spark timings for the peripheral spark plugs.
Figure 40:
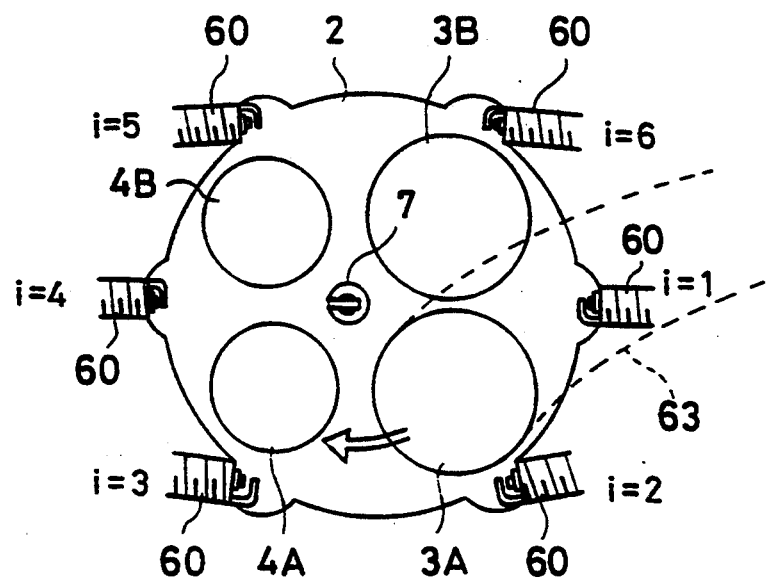

FIGS. 39 and 40 show an embodiment of the construction in the vicinity of the combustion chamber of the engine to be employed for the present invention. In this embodiment, the construction is the same as in FIG. 2 in that there are provided two air intake ports 3A and 3B and two exhaust ports 4A and 4B, yet it is different in that a total number of six peripheral spark plugs 60 are disposed. These plugs are provided with suffix i (where i=1 to 6) for distinction from each other.

A common air intake passage 61 through which the first air intake port 3A is communicated with the second air intake port 3B has a swirl control valve 62, and a supplementary air intake passage 63 is so constructed as to branch from the common air intake passage 61 at an immediately upstream port, thereby bypassing the swirl control valve 62 and then communicating on the opposite side with the air intake port 3A. The supplementary air intake passage 63 is set so as to have a smaller effective opening area and to direct its opening in the direction tangent to the cylinder, thereby causing a swirl of the intake air. With this arrangement, as the swirl control valve 62 is opened, almost all quantity of the intake air is allowed to be fed from both of the first and second air intake ports 3A and 3B, leading to a swirl ratio as low as substantially zero. It is thus to be noted that the smaller the opening angle of the swirl control valve 62 the larger the quantity of the intake air to be fed through the supplementary air intake passage 63, thereby resulting in the maximum swirl ratio when the swirl control valve 62 is fully closed.

Figure 42:
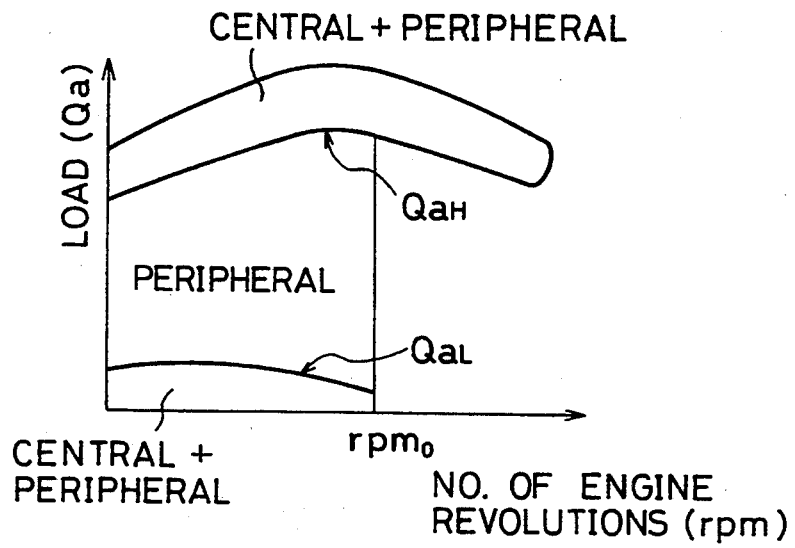
Figure 43:
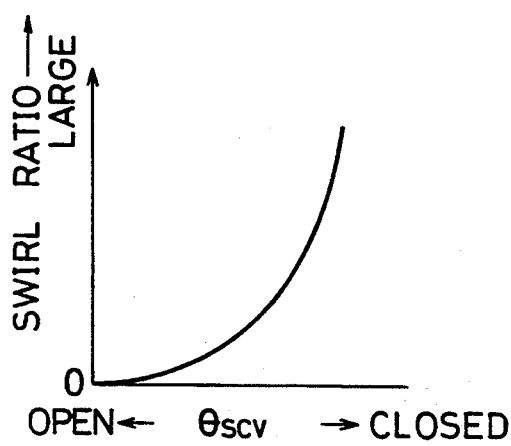

FIG. 42 shows an example in which the central spark plug 7 and the peripheral spark plugs 60 are sparked in the running region. The running region in which both of the central spark plug 7 and the peripheral spark plugs 60 are sparked is also set in the region on the extremely low load, unlike the case as shown in FIG. 8. In this setting, a swirl is caused to occur in both of the running region wherein only the peripheral sparking is performed and the running region wherein both of the central and peripheral spark plugs are sparked in the extremely low load region. On the contrary, no swirl is caused to occur in the running region wherein both of the central and peripheral sparking are performed in the high load region (control over the swirl control valve).

The swirl control valve 62 and the fuel injection valve 16 are controlled by a control unit U2 which in turn is provided with signals from each of sensors 71 to 74, inclusive. The sensor 71 is to sense the quantity of intake air, the sensor 72 is to sense the number of revolutions of the engine, the sensor 73 is to sense the temperature of a cooling water, and the sensor 74 is to sense the temperature of intake air.

Figure 41:
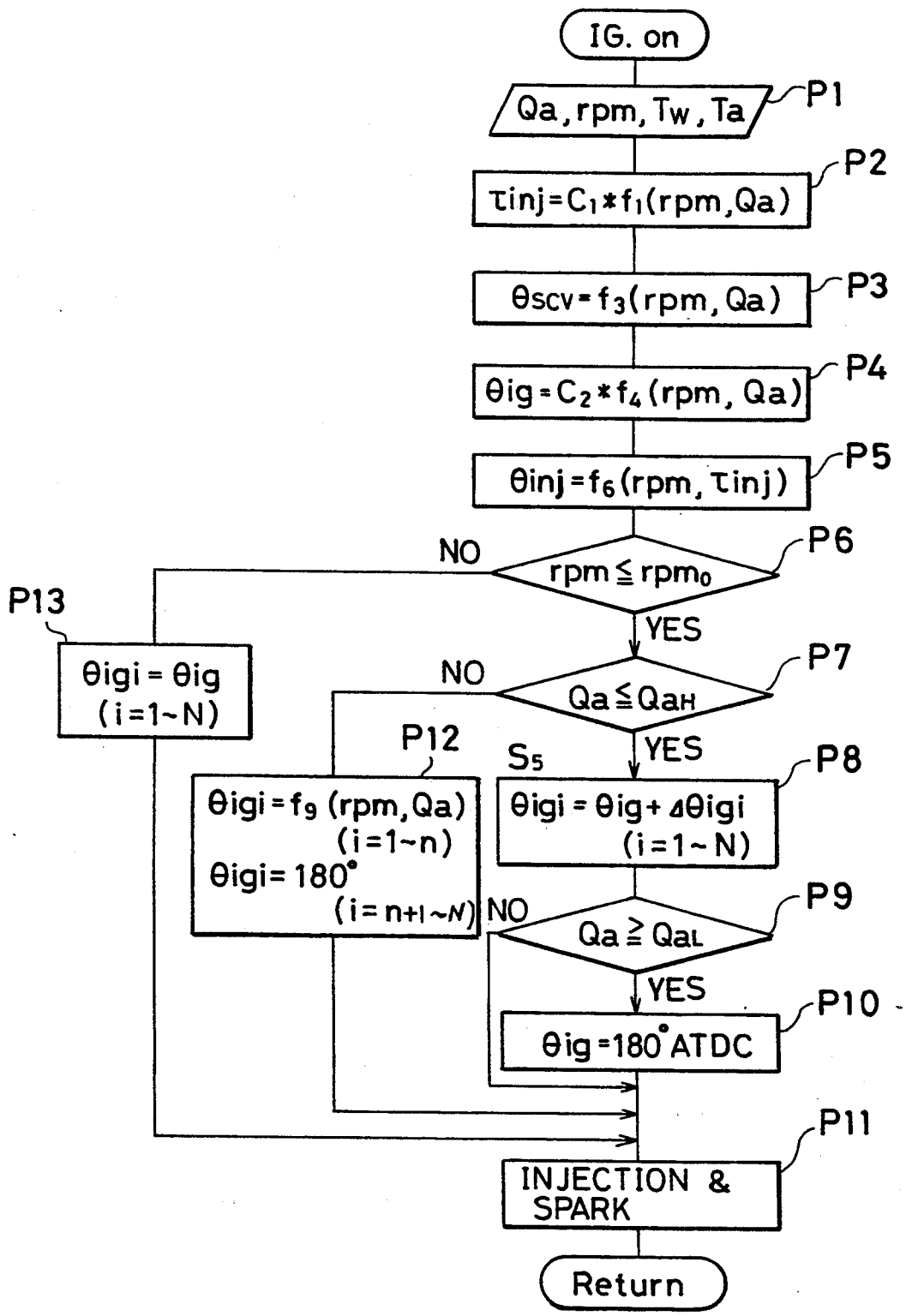

Given the foregoing, the present invention will be described more in detail with reference to flowcharts as shown in FIG. 41.

First, at step P1 (denoting steps in the following description), a quantity of intake air, Qa, as an engine load, number of revolutions of the engine, rpm, cooling water temperature, Tw, and temperature of intake air, Ta, are read, followed by proceeding to step P2 at which a fuel injection pulse width, $\tau_{inj}$, is determined by multiplying a basic value obtained on the basis of the quantity of intake air, Qa, and the number of revolutions of the engine, rpm, with a correction coefficient $C_1$ set on the basis of the cooling water temperature, Tw, and the intake air temperature, Ta.

Figure 44:
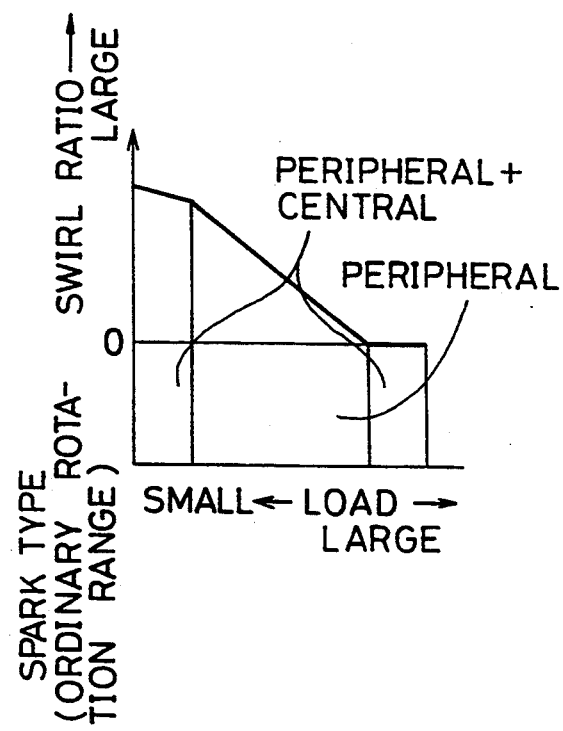

Then, at step P3, the opening angle of the swirl control valve 62, $\theta_{scv}$, is determined on the basis of the intake air quantity Qa and the number of revolutions of the engine, rpm. In this case, given the number of revolutions of the engine being equal to or lower than the number of stationary revolutions, $rpm_0$ (as shown in FIG. 42), the swirl ratio is first determined on the basis of the intake air quantity Qa with reference to the graph as shown in FIG. 44, and then the opening angle of the swirl control valve, $\theta_{scv}$, is determined on the basis of the above graph.

Then, the program flow goes to step P4 at which a spark timing of the central spark plug 7, $\theta_{ig}$, is determined by multiplying a basic value obtained on the basis of the number of revolutions of the engine, rpm, and the fuel injection pulse width, $\tau_{inj}$, with a correction coefficient, $C_2$, set on the basis of the cooling water temperature Tw and the intake air temperature Ta.

Figure 45:
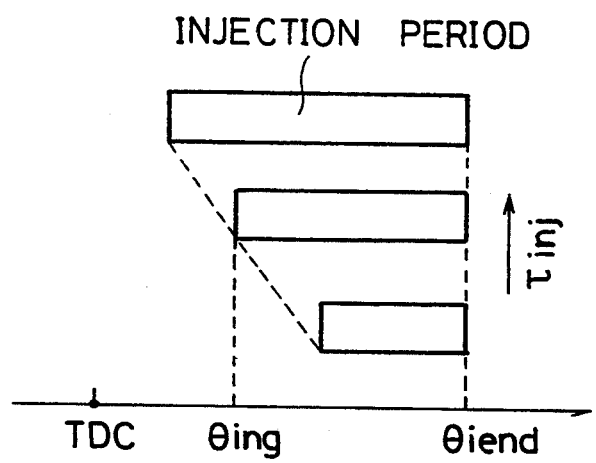
Figure 46:
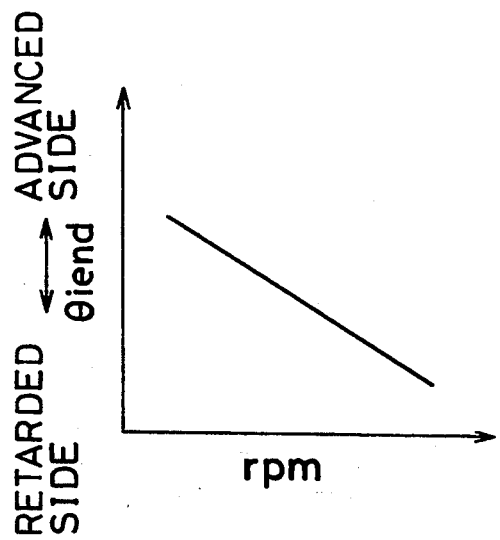

At step P5, an fuel injection start timing, $\theta_{inj}$, is determined on the basis of the numer of engine revolutions of the engine, rpm, and the fuel injection pulse width, $\tau_{inj}$. In this case, a fuel injection end timing, $\theta_{iend}$, is determined on the number of revolutions of the engine, rpm, from the graph as shown in FIG. 46. Then, the fuel injection start timing, $\theta_{inj}$, is determined on the fuel injection pulse width, $\tau_{inj}$, as shown in FIG. 45, so as to give the fuel injection end timing, $\theta_{iend}$.

Then, at step P6, a decision is made to determine if the number of revolutions of the engine, rpm, is equal to or lower than the set number of revolutions thereof, $rpm_0$. If the result of decision at step P6 indicates as NO, that is, it is decided that the number of revolutions of the engine is in a high revolution range, the calculation of a phase control of spark timing is so delayed that the program flow goes to step P13 at which the spark timing of each of the peripheral spark plugs 60 (i=1 to 6) is so set as to become identical to the spark timing for the central spark plug. Thereafter, the program flow is transferred to step P11 at which the injection of fuel and the sparking are executed.

If the result of decision at step P6 indicates as YES, the program flow goes to step P7 at which a decision is made to determine if the intake air quantity Qa is equal to or lower than a predetermined quantity QaH as shown in FIG. 42. When it is decided as NO in decision at step P7, the program flow proceeds to step P12 at which control over the number of spark plugs to be sparked is performed with control over a prevention of torque shock taken into consideration as will be described hereinafter.

When the result of decision at step P7 indicates as YES, the program flow goes to step P8 at which the spark timing, $\theta_{igi}$, for each of the peripheral spark plugs 60 is determined as a value obtained by adding a predetermined phase difference, $\Delta\theta_{igi}$, as will be described hereinafter, the spark timing, $\theta_{ig}$, for central spark plug.

After step P8, the program flow goes to step P9 at which a decision is made to determine whether or not the intake air quantity Qa is equal to or larger than a predetermined value, QaL, as shown in FIG. 42. If the result of decision at step P9 indicates as NO, on the one hand, the program flow goes to step P11 as it is. If the result of decision at step P9 indicates as YES, on the other hand, the program flow goes to step P10 at which the spark timing, $\theta_{ig}$, for the central spark plug 7 is set to 180° after top dead point corresponding to the first half of the exhaust stroke. It is to be noted that the processing at step P10 is in a region wherein no sparking is originally performed by the central spark plug 7, however, the central spark plug 7 is sparked in such a manner that it is not involved with ignition of the fuel, at the point of time when there is no risk of burning the mixed gas, thereby preventing the damage of the central spark plug.

Description will now be made of the process of determining the phase difference, $\Delta\theta_{igi}$, between the peripheral spark plugs 60 at step P8. In this example, the phase difference, $\Delta\theta_{igi}$, is determined by the following formula:

$$\Delta\theta_{igi}=(\Delta\theta_{1igi}+\Delta\theta_{2igi})\times G$$

where $\Delta\theta_{1igi}$ is a first phase difference component;
$\Delta\theta_{2igi}$ is a second phase difference component; and
G is a correction coefficient.

Figure 47:
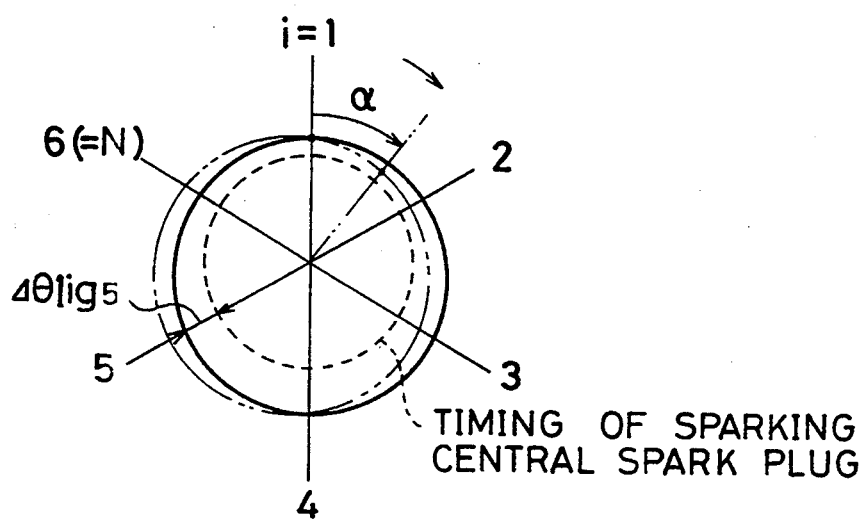
Figure 49:
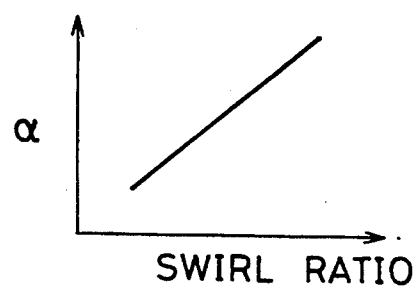
Figure 51:
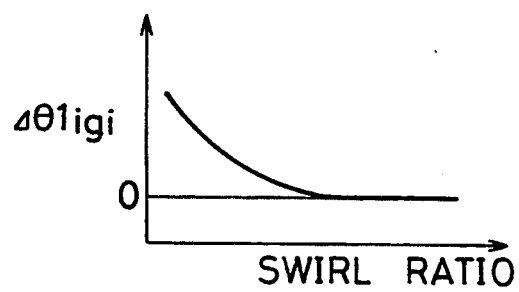

Further, the first phase difference component in turn is determined in the following way. First, as shown in FIG. 47, if the spark timing for the central spark plug 7 is shown by the circle as indicated by the broken line, the circle as indicated by the solid line is supposed to exist outside the circle as indicated by the broken line. The circle indicated by the solid line is supposed when the swirl ratio is zero, in which the line connecting the peripheral spark plugs i=1 and i=4 is drawn as a substantially synchronous central line and further as being offset on the side of the peripheral spark plug at i=4. It can be noted herein that the first phase difference component for each of the peripheral spark plugs when the swirl ratio is zero is given as a variation between the solid line and the broken line. And in FIG. 47, a first phase difference component, $\Delta\theta_{1ig5}$, for the peripheral spark plug at i=5 is taken as an example. When the swirl ratio is a value other than zero, an angle as represented by symbol $\alpha$ is given in accordance with its magnitude from the graph as shown in FIG. 49 and a circle as indicated by the chain line is given by rotating the circle as indicated by the solid line in FIG. 47 by the angle portion as represented by symbol $\alpha$ in the clockwise direction in the drawing. It is noted herein that a variation between the circles as indicated by the solid line and by the chain line is given as a first phase difference component, $\Delta\theta_{1igi}$, when the swirl ratio is not zero. The angle $\alpha$ is set from the point of view in which the stronger the swirl is, the more a concentrated mixed air that can allow the flame to spread in a favorite manner is transferred in the direction in which the swirl rotates. It is to be noted herein that a radius of the circle as indicated by the solid line in FIG. 47 is set with a flame spread speed in the position of each of the peripheral spark plugs and that the greater the swirl ratio is, the better the degree of mixture of the gases within the combustion chamber and the more uniform the physical properties of the mixed air become over the entire range of the peripheral direction of the cylinder, so that the first phase difference component, $\Delta\theta_{1igi}$, shows the tendency that the smaller the swirl ratio, the larger the first phase difference component, as shown in FIG. 51.

Figure 48:
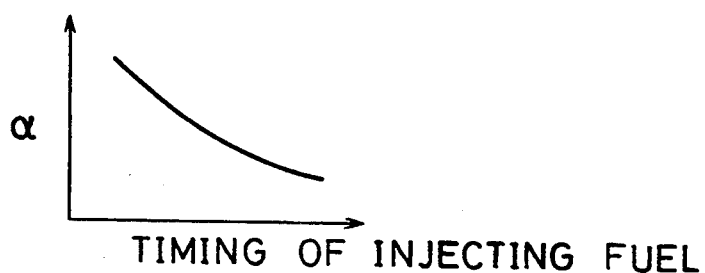
Figure 50:
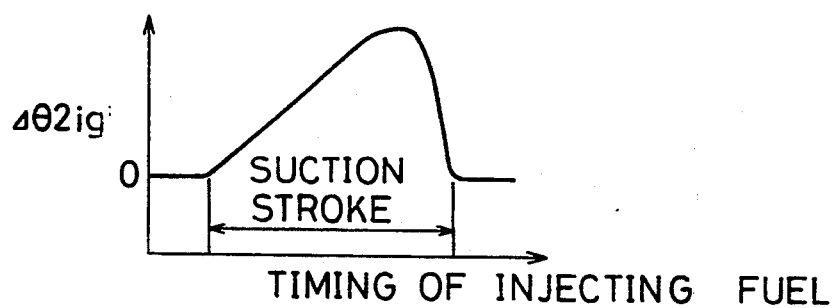

The second phase difference component, $\Delta\theta_{2igi}$, is determined in the following way. First, suppose that a fuel injection timing is altered during an air intake stroke while a swirl is occurring (although the injection itself is executed continuously). In this case, such a concentrated mixed air has the tendency that it is transferred to a larger extent in the direction in which the swirl rotates as the fuel injection start timing gets earlier. Further, the mixture of the mixed gases is promoted to a better extent as the fuel injection start timing gets earlier, so that the second phase difference component, $\Delta\theta_{2igi}$, is determined in the tendency like the first phase difference component, $\Delta\theta_{1igi}$. FIGS. 48 and 50 show such tendency.

Figure 52:
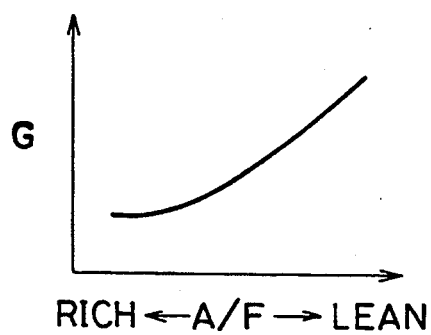
Figure 53:
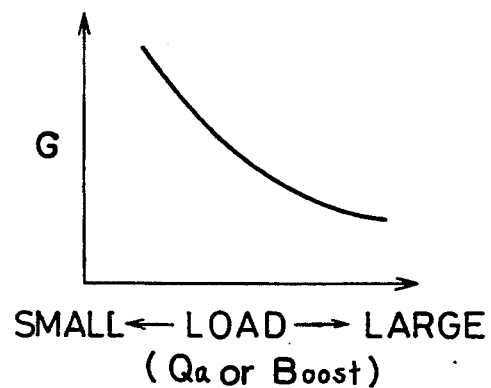
Figure 54:
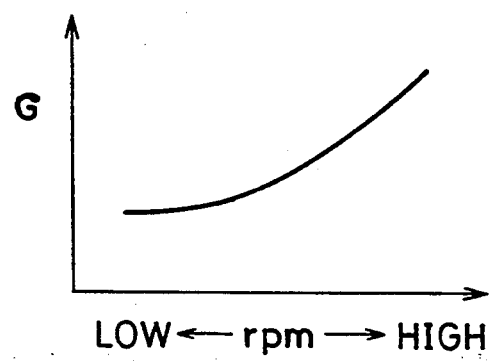

The correction coefficient, G, is set under the tendency as shown in FIGS. 52 to 54, inclusive, by using an air-fuel ratio of mixed air, engine load and number of revolutions of the engine as parameters.

Figure 57:
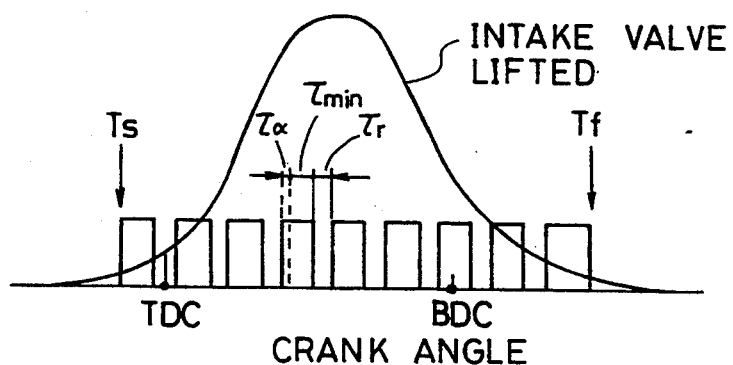
FIGS. 57 and 58 are views for description of divided injection of fuel.
Figure 58:
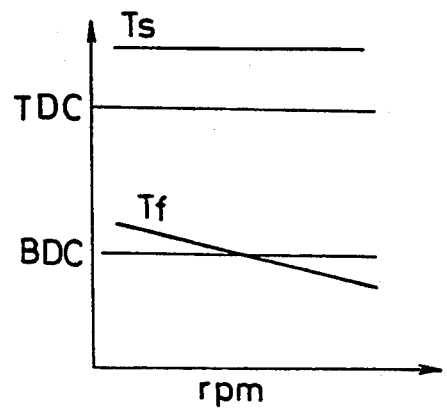

It is also possible to make the spread of the flame in the peripheral direction of the cylinder uniform by dividing injection of the fuel during an air intake stroke, in place of control over the phase difference of the spark timing as described hereinabove. In this case, as described hereinabove at step P8 in FIG. 41, the spark timing, $\theta_{igi}$, for each of the peripheral spark plugs 60 is set to be the same as the spark timing, $\theta_{ig}$, for the central spark plug. The divided injection of the fuel is set, for example, as shown in FIG. 57. In other words, a fuel injection start timing, Ts, and a fuel injection end timing, Tf, are first set by using the number of revolutions of the engine as a parameter, as shown in FIG. 58. And the number of times of injection, 1, is determined by the following formula:

$$n=(Ts-Tf)/(\tau min+\tau a+\tau r)$$

where $\tau min$ is a minimum fuel injection pulse width of a fuel injection valve;
$\tau a$ is an invalid injection time; and
$\tau r$ is a minimum rest time.

It is to be noted herein that if $n\times\tau min>\tau inj$, the injection is executed continuously, while if $n\times\tau min\geq\tau inj$, the injection is executed in a divided manner. It is noted herein that, if the number of times of injection, n, is not an integer when the divided injection is performed, it can be converted into an integer by adjusting a final fuel injection pulse width.

Figure 55:
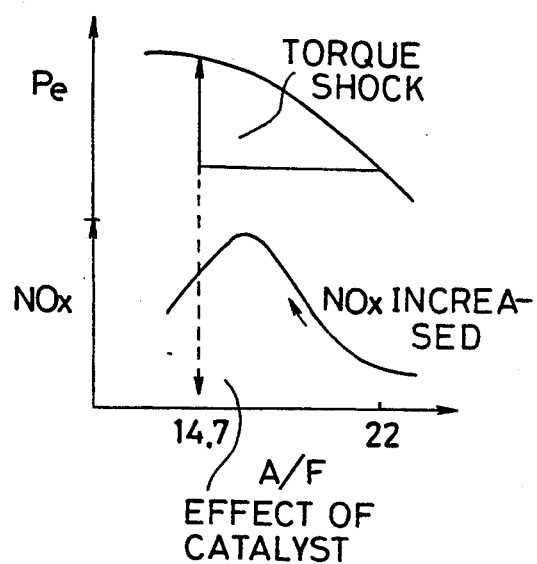
FIGS. 55 and 56 are views for description of control examples for preventing the increase in NOx resulting from the change in the air-fuel ratio and for preventing the torque shock.
Figure 56:
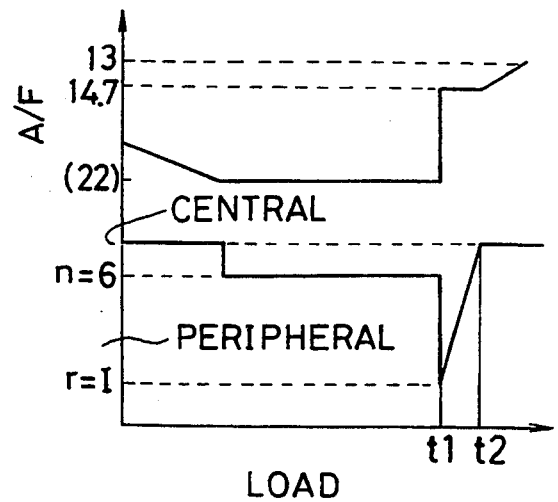

When the engine load is shifted to a high state from a low state, for example, when a state in which the peripheral sparking is performed is shifted to a state in which the sparking is performed by both of the central and peripheral spark plugs, the air-fuel ratio of the mixed air is changed from the lean state (for example, the air-fuel ratio being 22) to the rich state (for example, the air-fuel ratio being 14.7). In this case, if the air-fuel ratio of the mixed air would gradually be changed, NOx is increased during this period of time, as shown in FIG. 55. On the contrary, when the air-fuel ratio of the mixed air would rapidly be varied, a large degree of torque shock will occur. In order to prevent such an increase in NOx and such a large degree of torque shock, the present invention is so designed as to first prevent the increase in NOx by rapidly changing the air-fuel ratio of the mixed air, while the number of spark plugs to be sparked has once been reduced to only one, then gradually increasing the number of spark plugs to be sparked, and finally sparking all the spark plugs, thereby preventing the torque shock from occurring. FIG. 56 shows the manner in which the air-fuel ratio of the mixed air is changed and the number of spark plugs is gradually increased: In this drawing, a point of time, t1, stands for the point of time when the air-fuel ratio of the mixed air is changed, and a point of time, t2, stands for the point of time when control over the number of spark plugs is finished in association with the change in the air-fuel ratio of the mixed air. This control corresponds to the contents of the control to be performed at step P12 in FIG. 41. It is to be noted in this case that the spark plugs which are not required for sparking in a transient range of the change in the air-fuel ratio are sparked, like at step P18, in such a manner as involving no ignition of the fuel, thereby preventing the spark plugs involved from damaging.

Although the present invention has been fully described in connection with the preferred embodiments thereof with reference to the accompanying drawings which are used only for the purpose of illustration, not limitation, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. An engine, wherein:
a plurality of sources of peripheral ignition are disposed at a plurality of locations in a circumferentially spaced relationship at a peripheral outer edge portion of a combustion chamber;
an ignition timing from at least one of said plurality of sources of peripheral ignition is set to differ from an ignition timing of at least one of the other of said plurality of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and
the ignition timing of each of said plurality of sources of peripheral ignition is set to be different from each of the others of said plurality of sources of peripheral ignition in accordance with a swirl ratio of intake air within the combustion chamber.

2. An engine, wherein:
a plurality of sources of peripheral ignition are disposed at a plurality of locations in a circumferentially spaced relationship at a peripheral outer edge portion of a combustion chamber;
an ignition timing from at least one of said plurality of sources of peripheral ignition is set to differ from an ignition timing of at least one of the other of said plurality of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and
the ignition timing of each of said plurality of sources of peripheral ignition is set to be different from each of the others of said plurality of sources of peripheral ignition according to an air-to-fuel ratio of mixed gases to be supplied to the combustion chamber.

3. An engine, wherein:
a plurality of sources of peripheral ignition are disposed at a plurality of locations in a circumferentially spaced relationship at a peripheral outer edge portion of a combustion chamber;
an ignition timing from at least one of said plurality of sources of peripheral ignition is set to differ from an ignition timing of at least one of the other of said plurality of sources of peripheral ignition to allow a flame of combustion, which is ignited and produced from each of said Sources of peripheral ignition, to coincide with each other in a circumferential direction of the combustion chamber prior to coincidence at a center of the combustion chamber, at least in a particular running region of the engine; and
the ignition timing of each of said plurality of sources of peripheral ignition is set by adding a predetermined deviation to a predetermined reference ignition timing; and
the ignition timing of each of said plurality of sources of peripheral ignition is set to be different from each of said others of said plurality of sources of peripheral ignition by setting said predetermined deviation for each of said plurality of sources of peripheral ignition to be different;
said deviation is determined on the basis of at least one of a swirl ratio of intake air within the combustion chamber, and an air-to-fuel ratio of a mixed fuel to be supplied to the combustion chamber.

4. An engine as claimed in claim 3, wherein said deviation is further determined on the basis of at least one of a rate of rotation of the engine, the injection timing of a mixed fuel to be supplied to the combustion chamber, and an air-to-fuel ratio of the mixed fuel to be supplied to the combustion chamber.

5. An engine, wherein:
a plurality of sources of peripheral ignition are disposed at a plurality of locations in a circumferentially spaced relationship at a peripheral outer edge portion of a combustion chamber;
an ignition timing from at least one of said plurality of sources of peripheral ignition is set to differ from an ignition timing of at least one of the other of said plurality of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and the ignition timing of each of said plurality of sources of peripheral ignition is set by adding a predetermined deviation to a predetermined reference ignition timing; and the ignition timing of each of said plurality of sources of peripheral ignition is set to be different from each of said others of said plurality of sources of peripheral ignition by setting said predetermined deviation for each of said plurality of sources of peripheral ignition to be different;

said deviation is determined on the basis of a swirl ratio of intake air within the combustion chamber and an air-to-fuel ratio of the mixed fuel to be supplied to the combustion chamber; and said deviation is further corrected on the basis of at least one of a rate of rotation of the engine, the injection timing of the mixed fuel to be supplied to the combustion chamber, and the air-to-fuel ratio of the mixed fuel to be supplied to the combustion chamber.

6. An engine, wherein:
a plurality of sources of peripheral ignition are disposed at a plurality of locations in a circumferentially spaced relationship at a peripheral outer edge portion of a combustion chamber;

an ignition timing from at least one of said plurality of sources of peripheral ignition is set to differ from an ignition timing of at least one of the other of said plurality of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and ignition timing of each of said plurality of sources of peripheral ignition differ from each other in accordance with a swirl ratio of intake air within the combustion chamber.

7. An engine as claimed in claim 6, wherein said swirl ratio of the intake air is set in accordance with a load of the engine.

8. An engine wherein:
a plurality of sources of peripheral ignition are disposed at a plurality of locations in a circumferentially spaced relationship at a peripheral outer edge portion of a combustion chamber;

an ignition timing of at least one of the plurality of sources of peripheral ignition is set to differ from at least one of the others of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and the ignition timing of each of said plurality of sources of peripheral ignition is set in accordance with a swirl ratio of intake air within the combustion chamber.

9. An engine wherein:
a plurality of sources of peripheral ignition are disposed at a plurality of locations in a circumferentially spaced relationship at a peripheral outer edge portion of a combustion chamber;

an ignition timing of at least one of the plurality of sources of peripheral ignition is set to differ from at least one of the others of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and the ignition timing of at least one of said plurality of sources of peripheral ignition is set to be different from at least one of the others of said plurality of sources of peripheral ignition according to an air-to-fuel ratio of mixed gases to be supplied to the combustion chamber.

10. An engine wherein:
a plurality of sources of peripheral ignition are disposed at a plurality of locations in a circumferentially spaced relationship at a peripheral outer edge portion of a combustion chamber;

an ignition timing of at least one of the plurality of sources of peripheral ignition is set to differ from at least one of the others of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and the ignition timing of each of said plurality of sources of peripheral ignition is set by adding a predetermined deviation to a predetermined reference ignition timing; and the ignition timing of at least one of said plurality of sources of peripheral ignition is set to be different from at least one of said others of said plurality of sources of peripheral ignition by setting said predetermined deviation for at least one of said plurality of sources of peripheral ignition to be different;

said deviation is determined on the basis of at least one of a swirl ratio of intake air within the combustion chamber, and an air-to-fuel ratio of a mixed fuel to be supplied to the combustion chamber.

11. An engine as claimed in claim 10, wherein said deviation is further determined on the basis of at least one of a rate of rotation of the engine, the injection timing of a mixed fuel to be supplied to the combustion chamber, and an air-to-fuel ratio of the mixed fuel to be supplied to the combustion chamber.

12. An engine wherein:
a plurality of sources of peripheral ignition are disposed at a plurality of locations in a circumferentially spaced relationship at a peripheral outer edge portion of a combustion chamber;

an ignition timing of at least one of the plurality of sources of peripheral ignition is set to differ from at least one of the others of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and the ignition timing of each of said plurality of sources of peripheral ignition is set by adding a predetermined deviation to a predetermined reference ignition timing; and said deviation is determined on the basis of a swirl ratio of intake air within the combustion chamber and an air-to-fuel ratio of the mixed fuel to be supplied to the combustion chamber; and said deviation is further corrected on the basis of at least one of a rate of rotation of the engine, the injection timing of the mixed fuel to be supplied to the combustion chamber, and the air-to-fuel ratio of the mixed fuel to be supplied to the combustion chamber.

13. An engine wherein:

a plurality of sources of peripheral ignition are disposed at a plurality of locations in a circumferentially spaced relationship at a peripheral outer edge portion of a combustion chamber;

an ignition timing of at least one of the plurality of sources of peripheral ignition is set to differ from at least one of the others of sources of peripheral ignition to allow a flame of combustion, which is ignited and produced from each of said sources of peripheral ignition, to coincide with each other in a circumferential direction of the combustion chamber prior to coincidence at a center of the combustion chamber, at least in a particular running region of the engine; and the ignition timing of at least one of said plurality of sources of peripheral ignition differs from at least one other in accordance with a swirl ratio of intake air within the combustion chamber.

14. An engine as claimed in claim 13, wherein said swirl ratio of the intake air is set in accordance with a load of the engine.

* * * * *